United States Patent
Beacock et al.

(10) Patent No.: US 9,104,443 B2
(45) Date of Patent: Aug. 11, 2015

(54) CONTROL SOFTWARE WITH PROGRAMMABLE ARRAYS THAT ARE CONFIGURABLE FOR VEHICLES HAVING DIFFERENT PROPULSION SYSTEM CONFIGURATIONS

(75) Inventors: Benjamin A. C. Beacock, Orono (CA); John F. Larsen, Campbellcroft (CA); Christopher P. Lawrence, Toronto (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 833 days.

(21) Appl. No.: 13/077,646

(22) Filed: Mar. 31, 2011

(65) Prior Publication Data
US 2012/0253547 A1    Oct. 4, 2012

(51) Int. Cl.
| | |
|---|---|
| G06F 17/00 | (2006.01) |
| G05B 19/02 | (2006.01) |
| G06F 9/445 | (2006.01) |
| B60W 20/00 | (2006.01) |
| B60W 50/00 | (2006.01) |

(52) U.S. Cl.
CPC ............ *G06F 9/44505* (2013.01); *B60W 20/00* (2013.01); *B60W 2050/0026* (2013.01); *B60W 2050/0082* (2013.01)

(58) Field of Classification Search
CPC .............. G06F 9/44505; B60W 20/00; B60W 2050/0018; B60W 2050/0026
USPC ................................ 701/1, 21, 22, 74, 93, 99
See application file for complete search history.

(56) References Cited

U.S. PATENT DOCUMENTS

| | | |
|---|---|---|
| 2001/0032066 A1 | 10/2001 | Nowinski |
| 2003/0038842 A1 | 2/2003 | Peck et al. |
| 2004/0111210 A1* | 6/2004 | Davis et al. ................... 701/103 |

FOREIGN PATENT DOCUMENTS

| | | |
|---|---|---|
| CN | 1701169 A | 11/2005 |
| CN | 101802827 A | 8/2010 |

OTHER PUBLICATIONS

State Intellectual Property Office of the Peoples' Republic of China, Office Action for Chinese Patent Application No. 201210094687.0, mailed Feb. 8, 2014.

* cited by examiner

*Primary Examiner* — Redhwan K Mawari
*Assistant Examiner* — Rodney P King
(74) *Attorney, Agent, or Firm* — Ingrassia Fisher & Lorenz, P.C

(57) ABSTRACT

A method is provided for creating custom control software for a particular propulsion system configuration. Generic control software is provided that is configurable for use with a plurality of different propulsion system configurations. The generic control software is generically designed to control each of the different propulsion systems regardless of their different propulsion system configurations. The generic control software comprises a plurality of programmable arrays (or configuration tables). Information that characterizes a particular propulsion system configuration of the plurality of different propulsion system configurations is input into the programmable arrays to configure the generic control software into custom control software that is customized for use and designed to operate with the particular propulsion system configuration. The generic control software is configured into the custom control software that is applicable to and customized for use with the particular propulsion system configuration only after being programmed with the information that characterizes the particular propulsion system configuration.

19 Claims, 21 Drawing Sheets

CONTROL SOFTWARE WITH PROGRAMMABLE ARRAYS THAT ARE CONFIGURABLE FOR VEHICLES HAVING DIFFERENT PROPULSION SYSTEM CONFIGURATIONS

TECHNICAL FIELD

Embodiments of the subject matter described herein relate generally to vehicles including hybrid, electric, and fuel cell vehicles. More particularly, embodiments of the subject matter relate to methods for creating generic control software (e.g., computer program products) that include programmable arrays that allow the generic control software to be configured for use with any one of a number of propulsion system configurations that are implemented in different vehicles.

BACKGROUND

In recent years, vehicles such as hybrid, electric, and fuel cell vehicles have become increasingly popular. This has led to the development of a number of propulsion system architectures that are employed in such vehicles. A propulsion system of a vehicle includes various hardware components that are involved in propulsion of the vehicle including wheel/corners of the vehicle, motors, energy sources, energy, resistive energy dissipaters, voltage converters, power distribution units, etc.

Each particular type of propulsion system has a configuration that is defined by a number of hardware components and their relative location within that particular propulsion system architecture. The configuration of a particular propulsion system can vary widely. For example, the number of motors, energy sources, etc. in a particular propulsion system, as well as their configuration and location, can be different in each propulsion system architecture. In addition, new propulsion system architectures are currently being be developed.

Hybrid, electric, and fuel cell vehicles include one or more electric motors that are supplied with power via one or more energy sources, such as batteries, fuel cells, etc. One of the challenges in the development of such vehicles involves efficient use of energy source(s) that are available in a particular vehicle. As such, these vehicles typically include control systems that use control software to configure, manage and control the vehicle's propulsion system components as well as the use of its energy source(s) by those components. This control software includes power and/or energy control software.

For a particular propulsion system configuration, custom control software is written and developed that is designed to work in conjunction with that particular propulsion system configuration. The control software is designed to support a specific propulsion system architecture, and to the extent it needs to be applied to a different propulsion system architecture, then it must be re-written, re-compiled and/or re-verified to account for architectural features of a particular propulsion system architecture. Software development is time consuming, and requires expenditure of substantial resources (e.g., time, money, effort, etc.).

As the number of different propulsion system configurations continues to increase, the burden on vehicle manufacturers increases since they must develop custom control software that is designed for each one of the particular propulsion system architectures.

BRIEF SUMMARY

The current approach for creating control software requires a separate software development effort for each particular propulsion system configuration, and can therefore be very time consuming. It would be desirable to reduce resources expended in creating such control software when a different propulsion system configuration is presented that requires such control software. It would also be desirable to provide a method for creating control software that can be used with a wide variety of propulsion system architectures regardless of their particular configuration.

In accordance with the disclosed embodiments, reconfigurable control software is provided that includes programmable arrays. The programmable arrays allow the control software to be configured and customized for use with a particular one of a number of different propulsion system hardware configurations. The disclosed embodiments can, in general, be applied to any control software that will operate with a wide variety of possible propulsion system architectures.

In accordance with some of the disclosed embodiments, a method is provided for creating custom control software for a particular propulsion system configuration. Generic control software is provided that is configurable for use with a plurality of different propulsion system configurations. The generic control software is generically designed to control each of the different propulsion systems regardless of their different propulsion system configurations. The generic control software comprises a plurality of programmable arrays (or configuration tables). Information that characterizes a particular propulsion system configuration can be input into the programmable arrays to configure the generic control software into custom control software that is customized for use and designed to operate with the particular propulsion system configuration. The generic control software is configured into the custom control software that is applicable to and customized for use with the particular propulsion system configuration after being programmed with the information that characterizes the particular propulsion system configuration.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
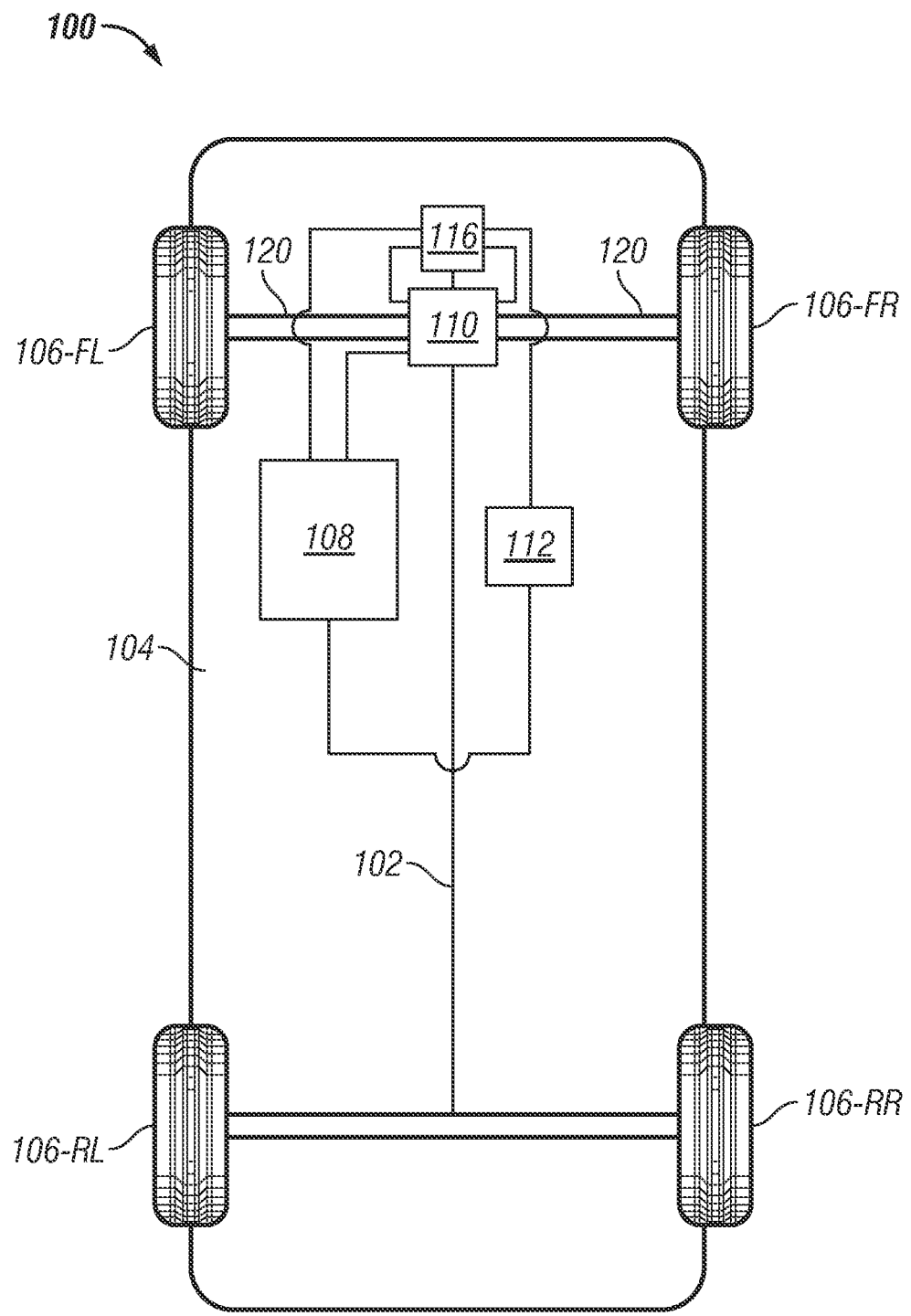
FIG. 1 is a schematic representation of an exemplary vehicle that may incorporate one of the disclosed embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. For the sake of brevity, conventional techniques related to inverters, electric motor control, electric and hybrid electric vehicle operation, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 1, for example, depicts one exemplary arrangement of elements, additional intervening elements, devices, features, or components may be present in an embodiment of the depicted subject matter.

Prior to describing the drawings, it is noted that throughout the drawings and description, reference number 106 is used to reference a wheel/tire/corner of a vehicle, reference number 110 is used to reference a motor of the vehicle, reference number 112 is used to reference a power/energy source of the vehicle. Throughout the drawings and description, the designators F, FR, FL, R, RR, RL are used to designate front, front-right, front-left, rear, rear-right and rear-left, respectively. These designators are used to differentiate between various instances of a particular tire/corner 106, a particular motor 110, and a particular power/energy source 112 of a vehicle. Further, for purposes of illustration only, it is presumed that all of the propulsion system architectures for the vehicles in FIGS. 1 and 3A-11 have the same four tires/corners 106-FL, 106-FR, 106-RL and 106-RR, and therefore the reference numbers for those four tires/corners are the same in all of the FIGS. 1 and 3A-10.

Referring to FIG. 1, a schematic representation of an exemplary vehicle 100 is depicted. The vehicle 100 generally includes a chassis 102, a body 104, four corners 106-FL, 106-FR, 106-RL, 106-RR, and an electronic control system 108. As used herein the term "corner" is used to refer to wheels/tires of a vehicle and other mechanical components that are used to couple the wheels to the drive shaft 120. The body 104 is arranged on chassis 102 and substantially encloses the other components of vehicle 100. The body 104 and chassis 102 may jointly form a frame. The corners 106-FL, 106-FR, 106-RL, 106-RR are each rotationally coupled to chassis 102 near a respective corner of body 104.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). However, it is to be appreciated that the disclosed embodiments are not limited to vehicles having four wheels, but can also be applied to vehicles with any number of wheels, such as motorcycles, 3-wheelers, multi-axle trucks, etc. The vehicle 100 may also incorporate any one of, or combination of, a number of different types of engines and/or traction systems, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor.

In the exemplary embodiment illustrated in FIG. 1, vehicle 100 is a fully electric or a hybrid electric vehicle, and vehicle 100 further includes an electric motor (or traction motor) 110, an energy source 112, and an inverter system 116. For some of the embodiments described here, energy source 112 can be a battery or fuel cell having a particular type, class, category, rating, etc. The energy source 112 is in operable communication and/or electrically connected to electronic control system 108 and to the inverter system 116.

The motor 110, in one embodiment, is a three-phase alternating current (AC) electric traction motor. As shown in FIG. 1, motor 110 may also include or cooperate with a transmission such that motor 110 and the transmission are mechanically coupled to at least some of the corners 106 through one or more drive shafts 120.

The electronic control system 108 is in operable communication with motor 110, the energy source 112, and inverter system 116. Although not shown in detail, electronic control system 108 includes various sensors and automotive control modules, or electronic control units (ECUs), such as an inverter control module and a vehicle controller, and at least one processor and/or a memory which includes instructions stored thereon (or in another computer-readable medium) for configuring and executing custom control software as described below.

Among other functionality, the electronic control system 108 may comprise one or more memory elements (not illustrated) for storing operating instructions and other unique stored program instructions (including both the generic control software that can be configured into custom control software), and one or more processing devices (not illustrated, but which can be implemented using one or more microprocessors, microcontrollers, digital signal processors (DSPs), customized processors, state machines, logic circuitry such as field programmable gate arrays (FPGAs), or any other device or devices that process information etc.) for executing the operating instructions and other unique stored program instructions (including the custom control software). The memory (not illustrated) may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other non-transitory storage medium for storing digital information.

Although FIG. 1 illustrates an example of a particular propulsion system architecture, a wide variety of propulsion system architectures having different hardware configurations could possibly be implemented depending on the design that is contemplated. A few such examples will be described below with reference to FIGS. 3A-10. Each propulsion system configuration has a different configuration of hardware components that are involved in propulsion of a vehicle. Because each of the different propulsion system configurations has a particular configuration of the hardware components that is different than other propulsion system configurations, the time and effort devoted to development of custom control software for each of these different configurations can be time consuming.

To address these problems, a method is provided for creating custom control software for a particular propulsion system configuration. Generic control software is provided that is configurable for use with a plurality of different propulsion system configurations. The generic control software is generically designed to control each of the different propulsion systems regardless of their different propulsion system configurations. The generic control software comprises a plurality of programmable arrays (or configuration tables). Information that characterizes a particular propulsion system configuration of the plurality of different propulsion system configurations is input into the programmable arrays to configure the generic control software into custom control software that is customized for use and designed to operate with the particular propulsion system configuration. The generic control software is configured into the custom control software that is applicable to and customized for use with the particular propulsion system configuration only after being programmed with the information that characterizes the particular propulsion system configuration.

Figure 2:
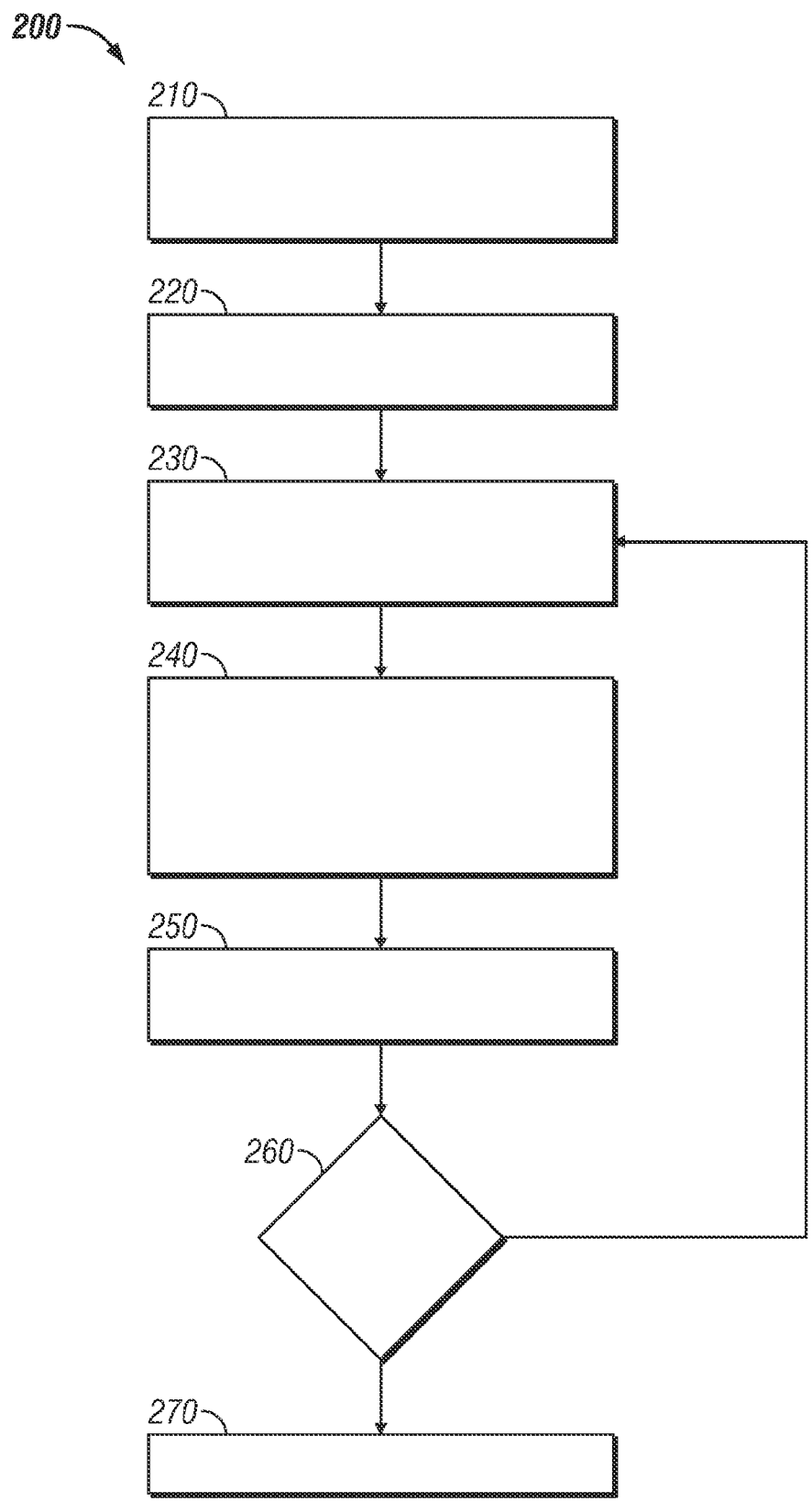
FIG. 2 is a flowchart that illustrates a method for configuring generic control software using programmable arrays to generate custom control software for a particular propulsion system configuration in accordance with some of the disclosed embodiments.

FIG. 2 is a flowchart that illustrates a method 200 for configuring generic control software using programmable arrays to generate custom control software for a particular propulsion system configuration in accordance with some of the disclosed embodiments.

At 210, generic control software is generated or created. The generic control software is generally applicable to a plurality of different propulsion system configurations, but must first be configured prior to becoming ready for use with any particular one of the propulsion system configurations.

The generic control software is embodied in a computer-readable medium having computer-executable instructions stored thereon. This computer-readable medium can be deployed within an on-board memory of a vehicle or can be maintained in an external database.

The generic control software is designed generically to control each of the different propulsion systems regardless of their different propulsion system configurations, but only upon being configured into the custom control software that is customized for use with the particular one of the different propulsion system configurations. In other words, the generic control software is designed to operate with any one of a wide variety of propulsion system configurations without the need to modify or recompile the control software. To allow for re-configurability, the generic control software includes a plurality or set of programmable arrays. The programmable arrays are generic and applicable to a wide variety of vehicle architectures. The term "programmable" refers to the fact that values or content of the arrays can be set based on characteristics of a particular propulsion system. In one embodiment, each of the programmable arrays can be implemented via one or more programmable configuration tables.

As will also be described below, by programming the programmable arrays, the generic control software can be adapted or configured (or re-configured) as custom control software that applies to a particular one of the propulsion system configurations. Stated differently, the programmable arrays allow for the generic control software to be programmed so that it is configured (or reconfigured) into custom control software that is applicable to or customized for use with any particular one of the plurality of different propulsion system configurations.

At 220, testing and validation of the generic control software can optionally be performed as needed.

At 230, characteristics of a particular one of the different propulsion system configurations can be determined. These characteristics can generally be thought of as features of a particular propulsion system, such as a particular configuration of hardware components (referred to below as a "particular hardware component configuration") of a particular vehicle. In general, the most basic propulsion system hardware components of the vehicle include corners (e.g., any number of tires/wheels), any number of motors such as electric motors, any number of energy sources such as high voltage batteries, fuel cells, etc., that can be arranged in a particular one of a number of different configurations with respect to one another. However, depending on the particular implementation of a vehicle, the propulsion system hardware components can include other components such as resistor arrays, super capacitors, power distribution units, voltage converters, auxiliary power modules, cooling system compressors, electric power steering motors, active suspension elements, on-board or off-board chargers, engine driven generators, etc. In one particular, non-limiting implementation that will be described in greater detail below, each of the different propulsion system configurations of each vehicle include at least one motor, a left-front corner, a right-front corner, a left-rear corner, a right-rear corner, and at least one energy source.

These characteristics can be translated into information that characterizes the particular one of the different propulsion system configurations. For example, in one implementation that will be described in detail below, the information that characterizes the particular propulsion system configuration may be specific values for the particular propulsion system configuration. The specific values correspond to the particular propulsion system configuration that has the particular hardware component configuration. These specific values are then used as inputs into the programmable arrays.

For example, in some embodiments, the specific values input into the plurality of programmable arrays for the particular propulsion system configuration (having the particular hardware component configuration) can define, for example, one or more of (a) a number of the hardware components in the particular propulsion system configuration, (b) a type for each of the hardware components in the particular propulsion system configuration, (c) a number of hardware components for each type of hardware component in the particular propulsion system configuration, (d) location of the hardware components in the particular propulsion system configuration, (e) relative location of and/or coupling relationships between each of the hardware components with respect to each other in the particular propulsion system configuration, etc.

At 240, the programmable arrays can be programmed with the information (that was determined at 230) that characterizes the particular propulsion system configuration of the particular vehicle so that the generic control software is configured (or re-configured, transformed, customized) into custom control software that is configured for and designed to operate with the particular propulsion system configuration so that it is customized for the particular propulsion system without the need for software recompilation. For example, in one implementation, the specific values (that were determined at 230) can be input into the programmable arrays.

When the specific values are input into the programmable arrays, this defines the particular propulsion system configuration that has the particular hardware component configuration, and a customized instantiation of the generic control software is produced that is configured for the particular propulsion system.

At 250, testing and validation of the custom control software can optionally be performed, and after testing, at 260, it can be determined whether or not the configuration of the particular propulsion system has changed (e.g., whether or not the particular hardware component configuration has changed).

When it is determined that the configuration of the particular propulsion system has changed, the method 200 loops back to 230. When it is determined that there are no further changes in the configuration of the particular propulsion system, it can be assumed that the custom control software is in complete, final form for that particular propulsion system configuration, and the method 200 ends at 270. Although not illustrated in FIG. 2, after the arrays have been programmed, the custom control software can be deployed on a memory or other computer-readable medium within the particular vehicle, and the computer-executable instructions of the custom control software can then be executed by a processor (e.g., one or more electronic control units in the particular vehicle such as ECU 108) that is designed to exercise control over the particular propulsion system hardware components of the particular vehicle that has the particular propulsion system configuration.

Thus, the programmable arrays allow portions of the generic control software that relate to the hardware components of propulsion systems to be made insensitive to the particular configuration of those hardware components. The programmable arrays can therefore provide flexibility in the generic control software and allow it to be applicable to multiple different propulsion system architectures for a wide range of hardware configurations. As such, there is no longer a need to modify or recompile the control software in response to changes in the propulsion system configuration that is used in a particular vehicle. This eliminates the need to modify or recompile the control system software in response to changes in propulsion system architecture, which decreases the software development time in the event of changes in the configuration.

In addition, because only one set of generic control software needs to be created, the method 200 can be repeated to generate custom control software for each of the different propulsion system configurations (that has a different hardware component configuration) by changing the information that is input to the programmable arrays. As such, the time, effort and expense involved in creating control software for each of the different propulsion system configurations can be greatly reduced.

Exemplary Propulsion System Architectures

FIGS. 3A through 10 illustrate examples of various propulsion system configurations. In these examples, it is presumed that each of the propulsion system configurations includes four corners 106-FL, 106-FR, 106-RL, 106-RR, at least one motor 110, and at least one energy source 112. These examples are non-limiting and a propulsion system may include any number of corners, motors or energy sources.

Figure 3A:
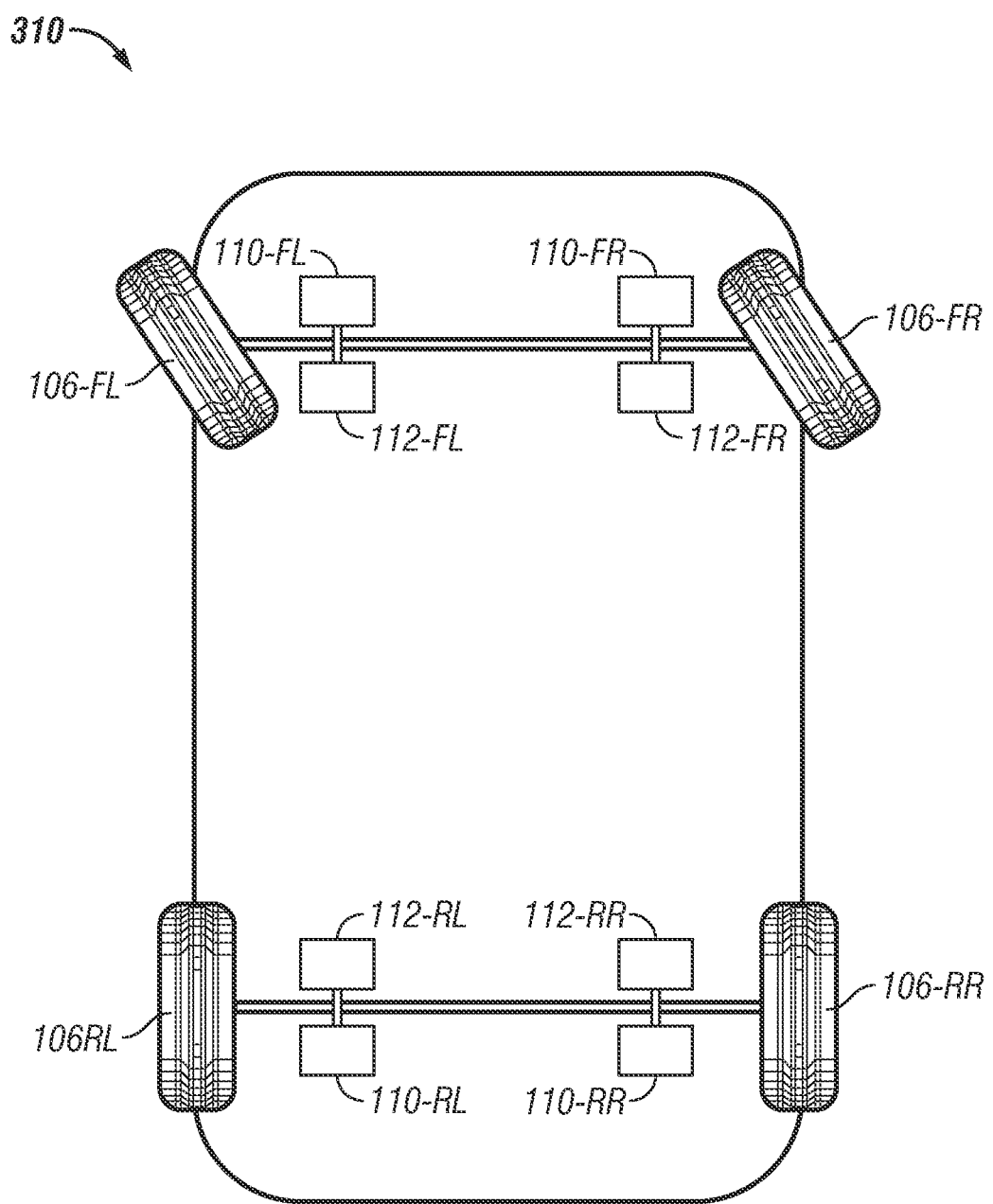
FIGS. 3A through 10 illustrate examples of various propulsion system configurations in accordance with some of the disclosed embodiments.

FIG. 3A illustrates an exemplary propulsion system configuration 310 that includes four corners 106-FL, 106-FR, 106-RL, 106-RR, four motors 110-FL, 110-FR, 110-RL, 110-RR (one for each corner), and four energy sources 112-FL, 112-FR, 112-RL, 112-RR that are associated with the motors 110-FL, 110-FR, 110-RL, 110-RR, respectively.

Figure 3B:
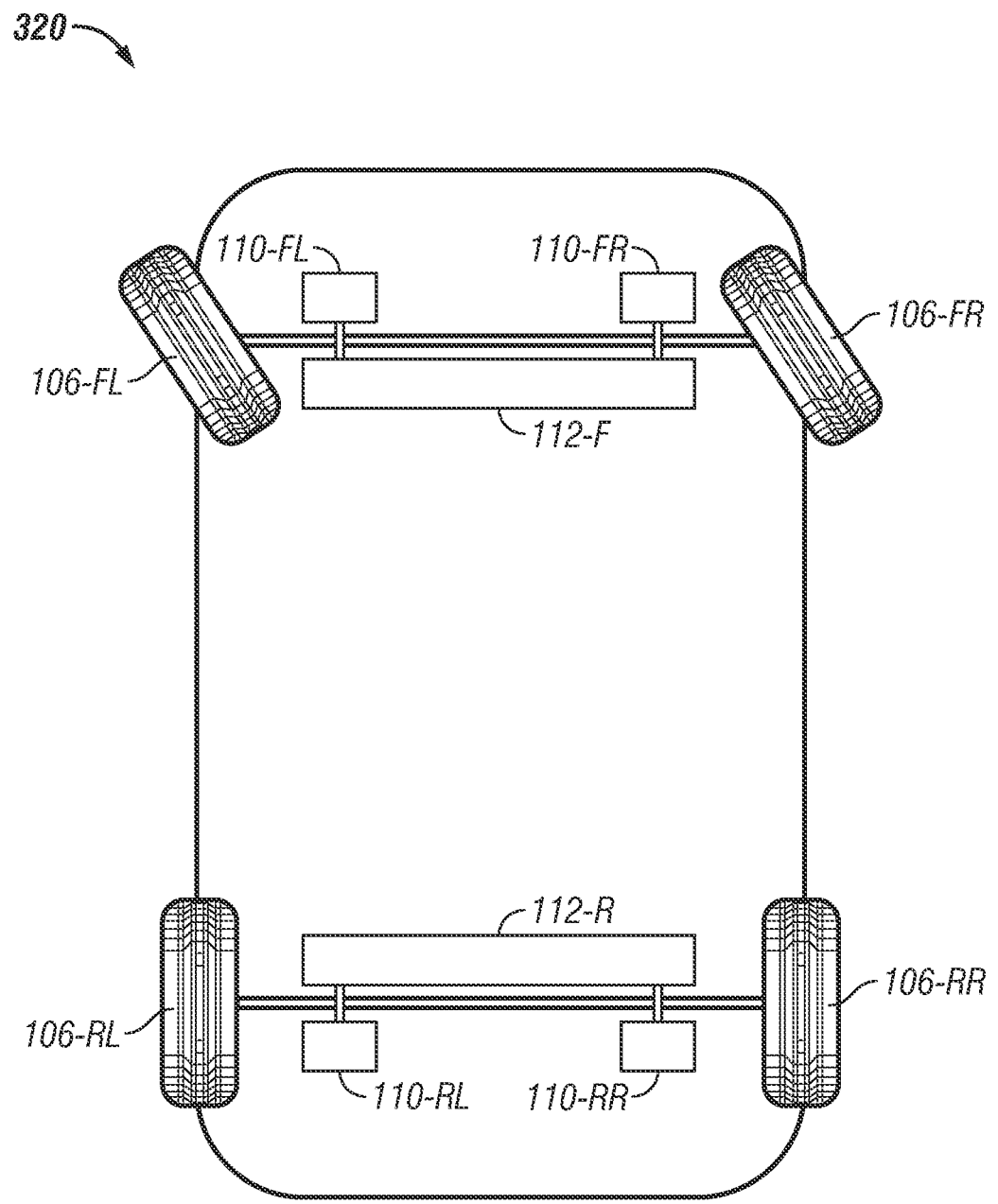

FIG. 3B illustrates an exemplary propulsion system configuration 320 that includes four corners 106-FL, 106-FR, 106-RL, 106-RR, four motors 110-FL, 110-FR, 110-RL, 110-RR (one for each corner), and two energy sources 112-F, 112-R that are associated with the motors 110-FL, 110-FR, and motors 110-RL, 110-RR, respectively.

Figure 3C:
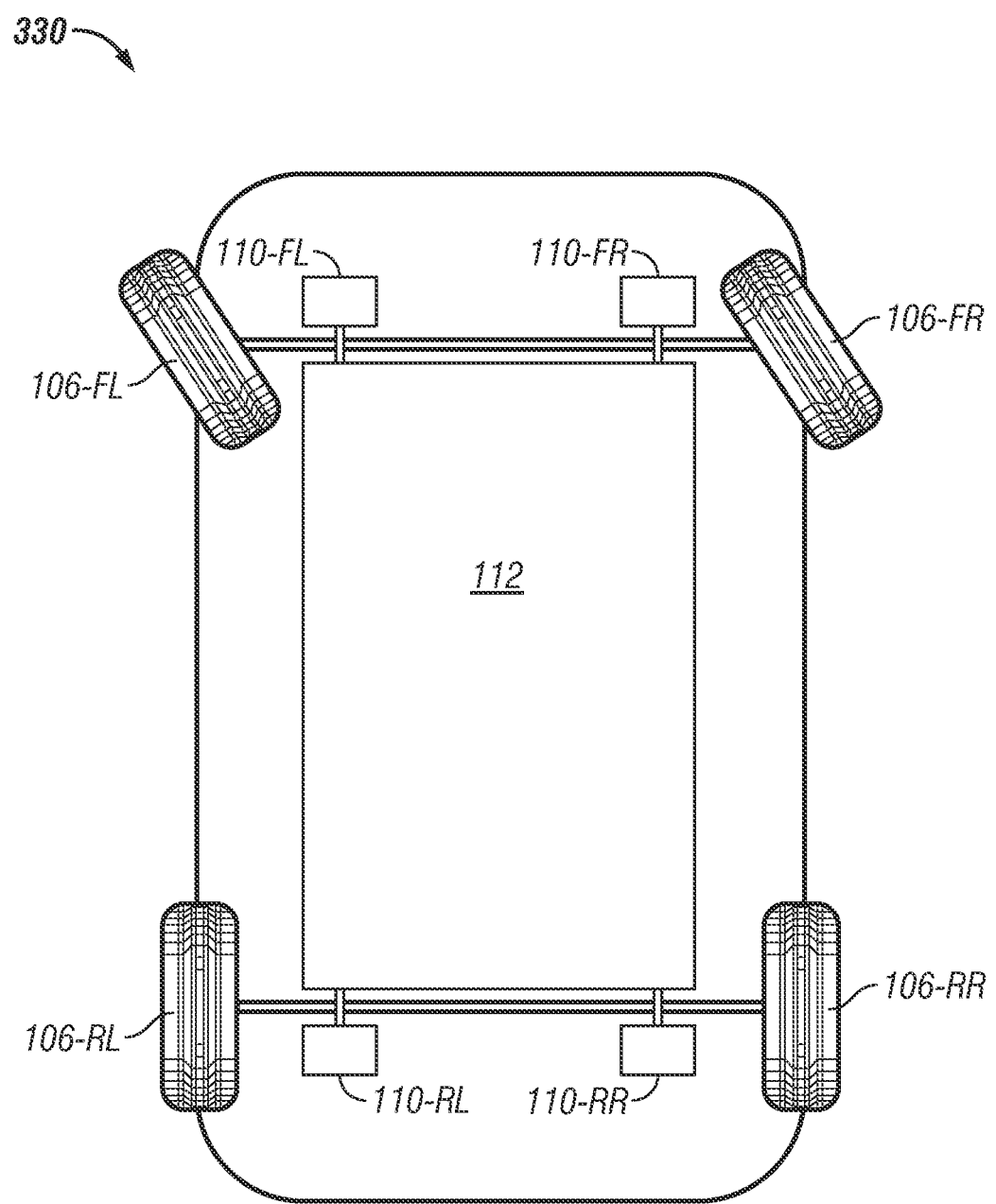

FIG. 3C illustrates an exemplary propulsion system configuration 330 that includes four corners 106-FL, 106-FR, 106-RL, 106-RR, four motors 110-FL, 110-FR, 110-RL, 110-RR (one for each corner), and one energy source 112 that is associated with each of the motors 110-FL, 110-FR, 110-RL, 110-RR.

Figure 3D:
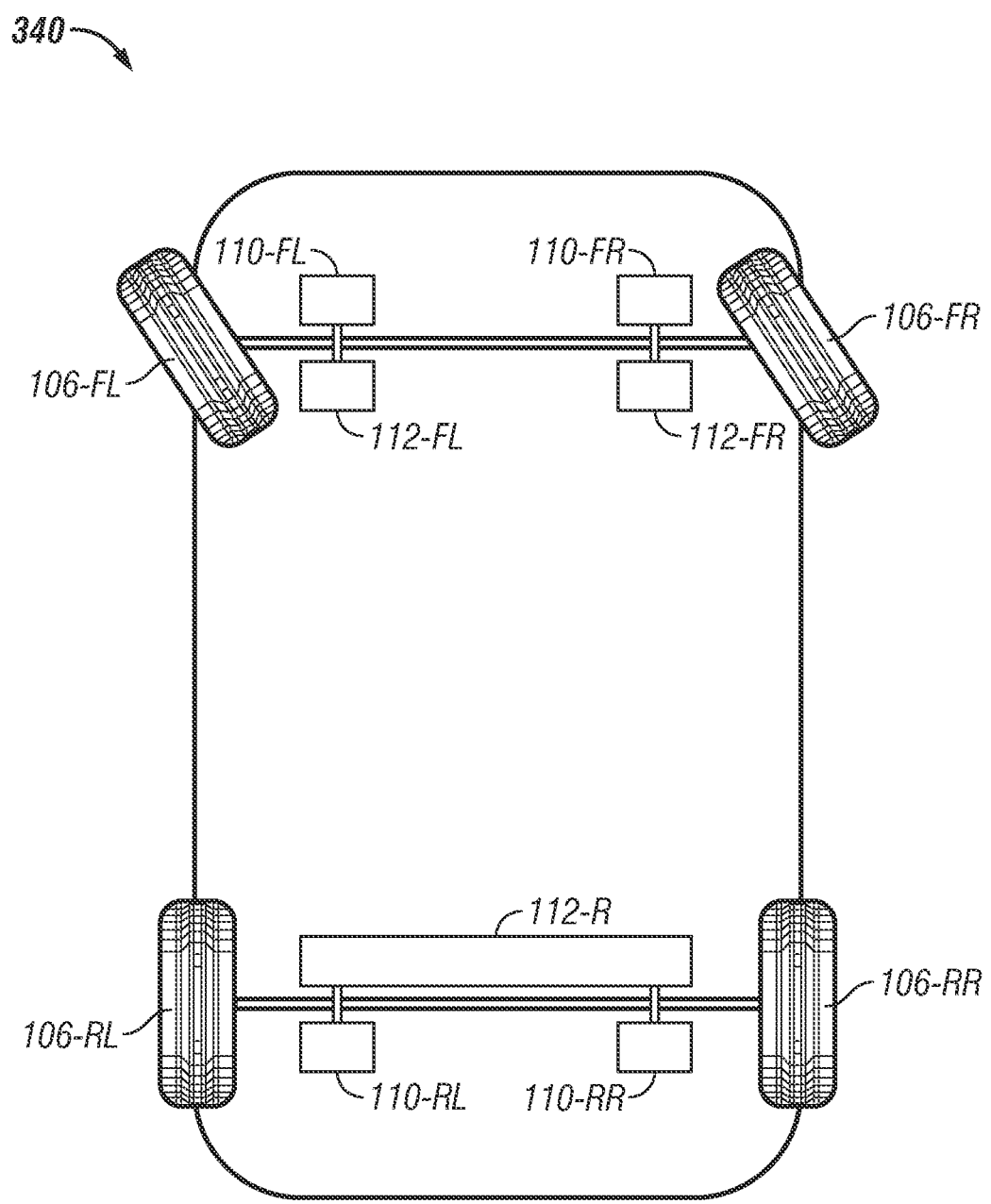

FIG. 3D illustrates an exemplary propulsion system configuration 340 that includes four corners 106-FL, 106-FR, 106-RL, 106-RR, four motors 110-FL, 110-FR, 110-RL, 110-RR (one for each corner), and three energy sources 112-FL, 112-FR, 112-R. Energy source 112-FL is associated with motor 110-FL, energy source 112-FR is associated with motor 110-FR, and energy source 112-R is associated with motors 110-RL, 110-RR.

Figure 3E:
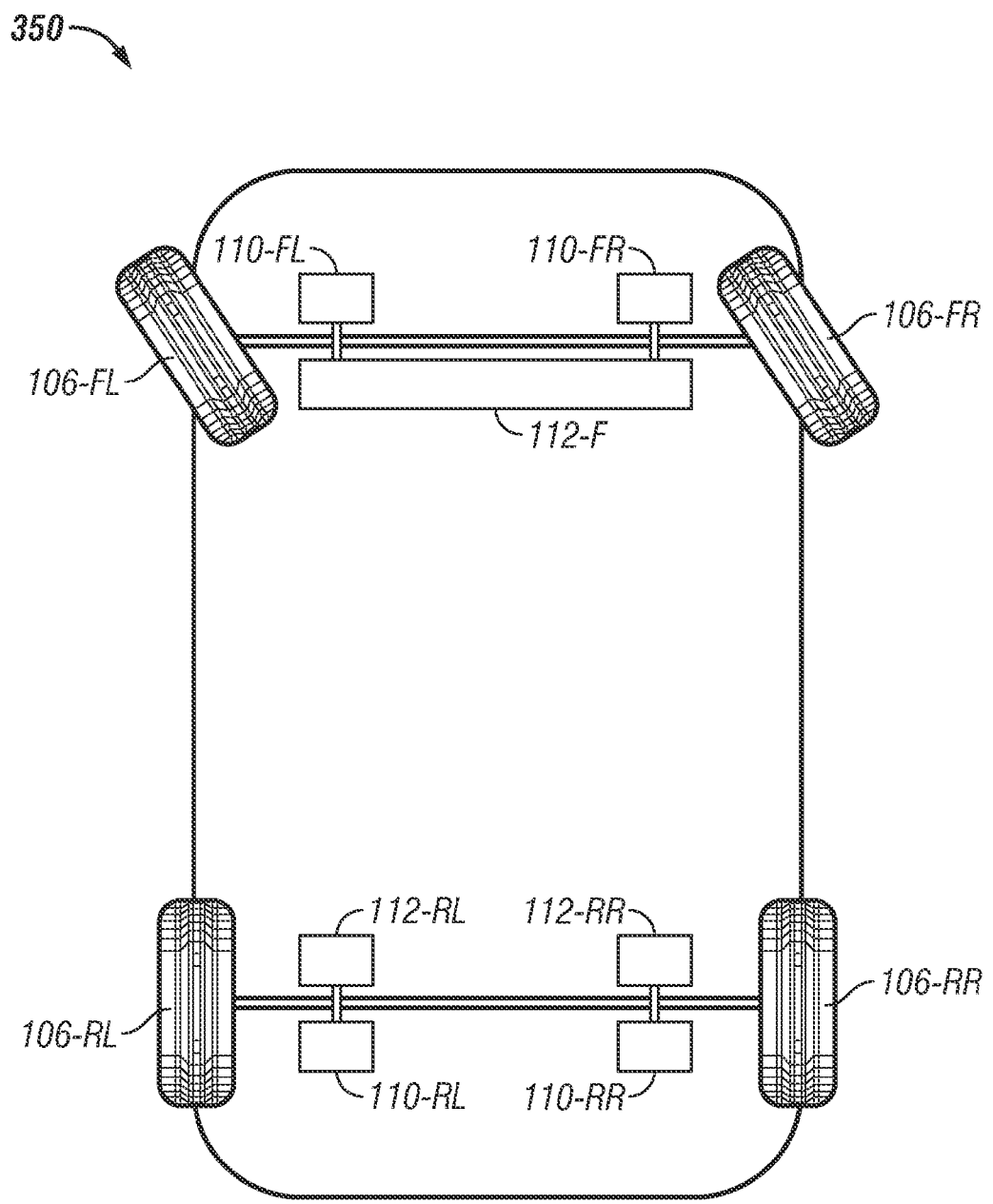

FIG. 3E illustrates an exemplary propulsion system configuration 350 that includes four corners 106-FL, 106-FR, 106-RL, 106-RR, four motors 110-FL, 110-FR, 110-RL, 110-RR (one for each corner), and three energy sources 112-F, 112-RL, 112-RR that are associated with motors 110-FL, 110-FR, motor 110-RL, and motor 110-RR, respectively. The motor 110-FL is associated with corner 106-FL, the motor 110-FR is associated with corner 106-FR, the motor 110-RL is associated with corner 106-RL, and the motor 110-RR is associated with corner 106-RR.

Figure 4A:
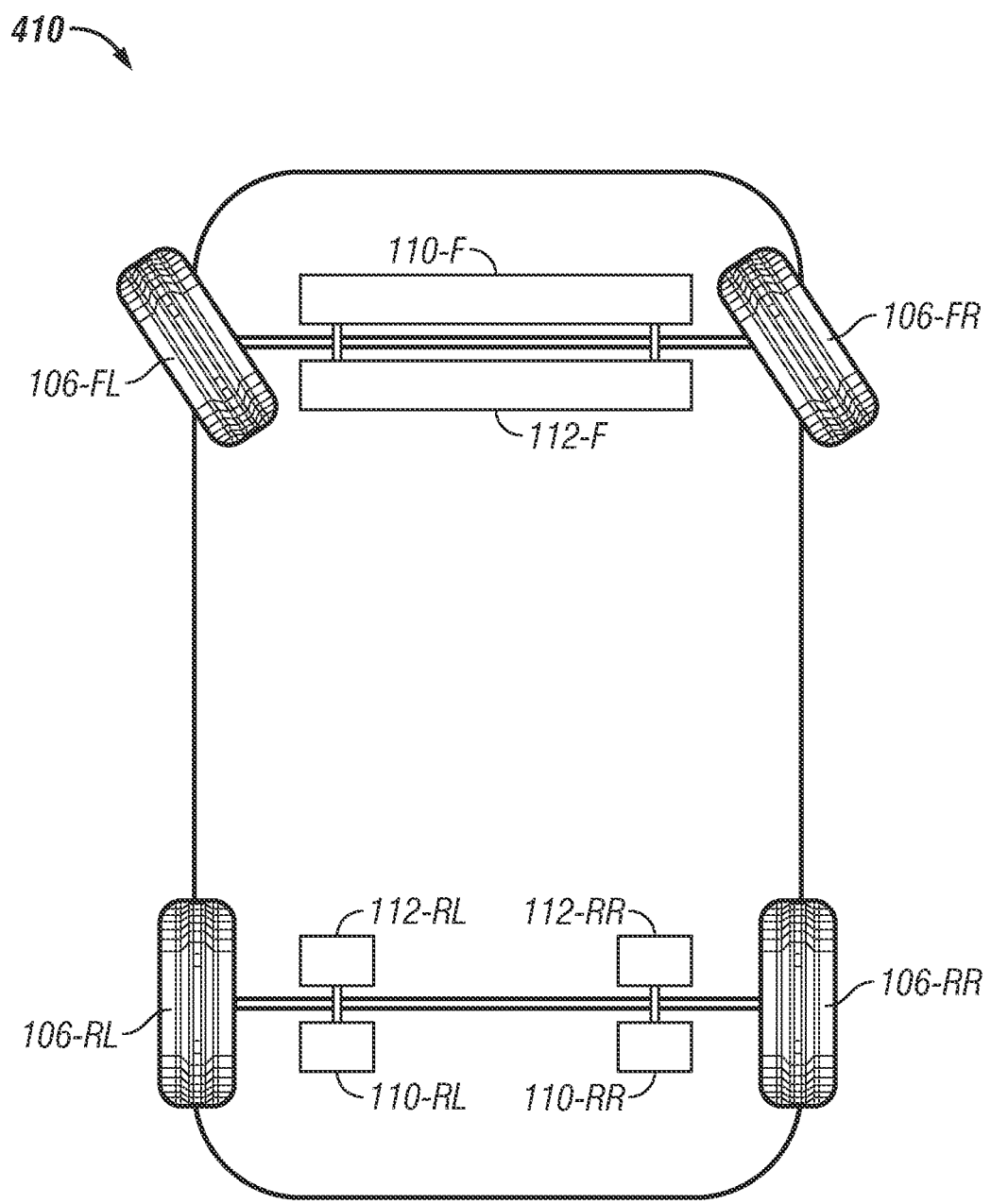

FIG. 4A illustrates an exemplary propulsion system configuration 410 that includes four corners 106-FL, 106-FR, 106-RL, 106-RR, one motor 110-F associated with corners 106-FL, 106-FR that are coupled to the front axle and two motors 110-RL, 110-RR that are associated with corners 106-RL, 106-RR that are coupled to the rear axle, and three energy sources 112-F, 112-RL, 112-RR that are associated with motor 110-F, motor 110-RL, and motor 110-RR, respectively.

Figure 4B:
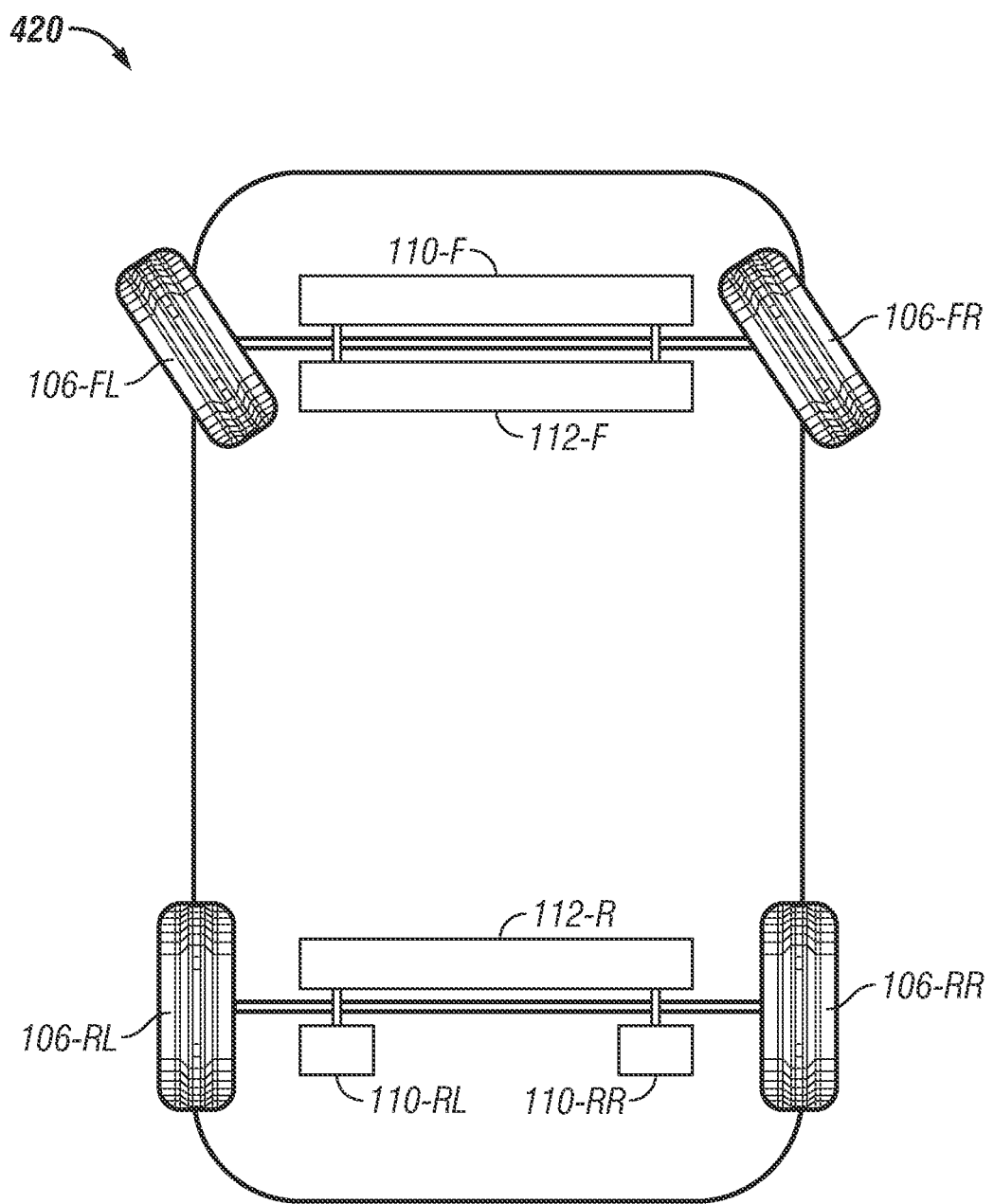

FIG. 4B illustrates an exemplary propulsion system configuration 420 that includes four corners 106-FL, 106-FR, 106-RL, 106-RR, one motor 110-F associated with corners 106-FL, 106-FR that are coupled to the front axle and two motors 110-RL, 110-RR associated with corners 106-RL, 106-RR that are coupled to the rear axle, and two energy sources 112-F, 112-R that are associated with motor 110-F, and motors 110-RL, 110-RR, respectively.

Figure 4C:
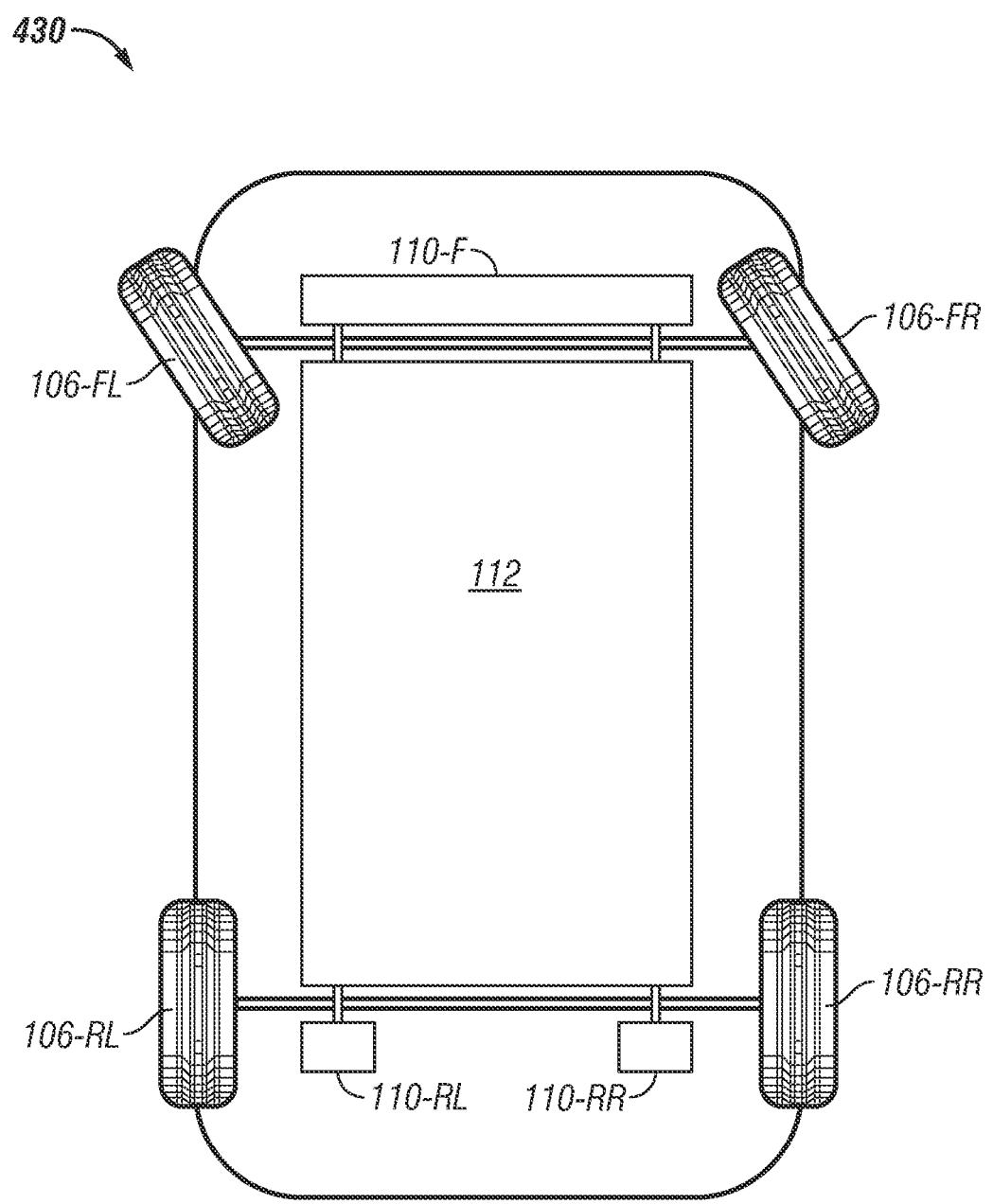

FIG. 4C illustrates an exemplary propulsion system configuration 430 that includes four corners 106-FL, 106-FR, 106-RL, 106-RR, one motor 110-F associated with corners 106-FL, 106-FR that are coupled to the front axle and two motors 110-RL, 110-RR that are associated with corners 106-RL, 106-RR that are coupled to the rear axle, and one energy sources 112 that is associated with each of motors 110-F, 110-RL, 110-RR.

Figure 5A:
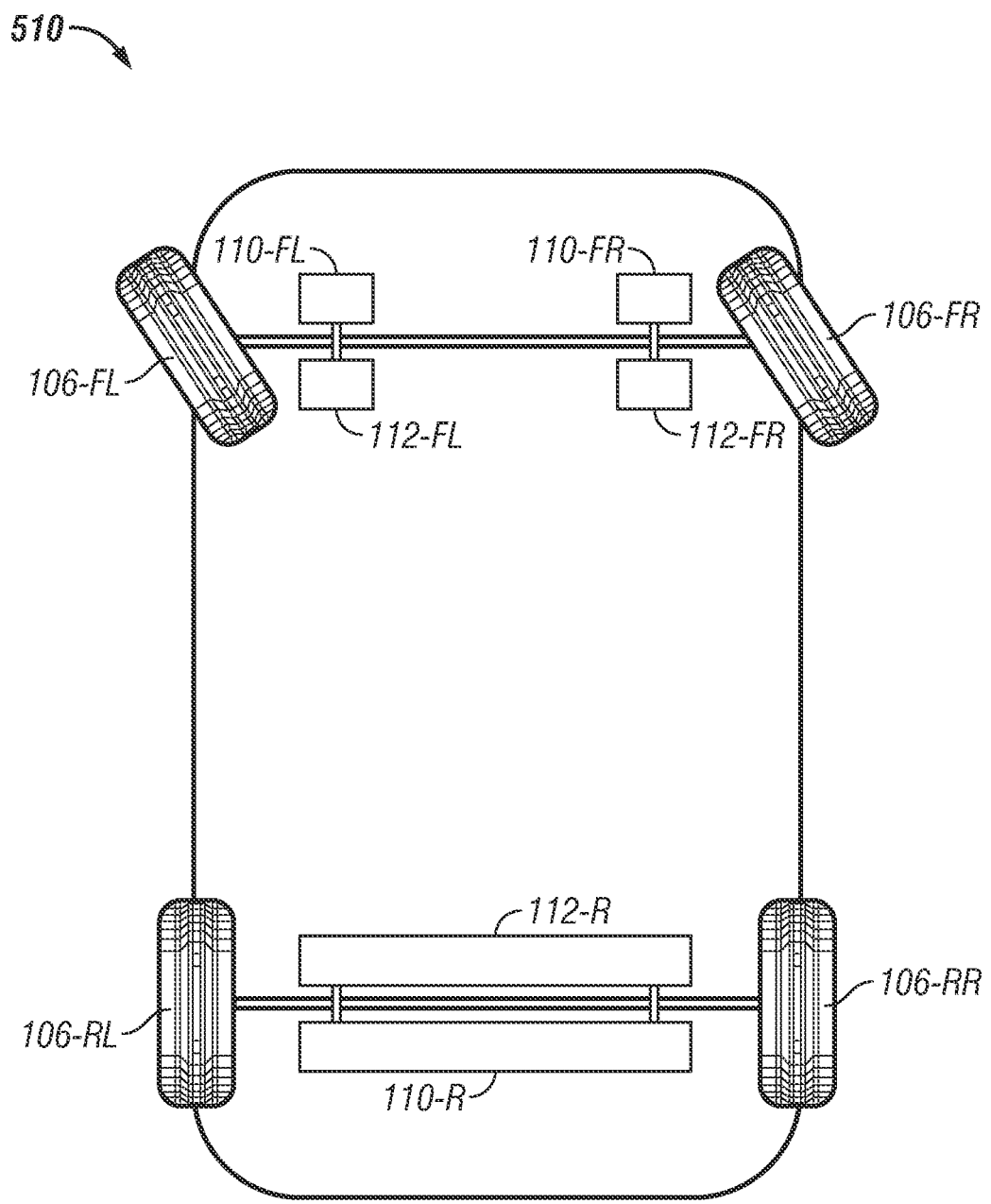

FIG. 5A illustrates an exemplary propulsion system configuration 510 that includes four corners 106-FL, 106-FR, 106-RL, 106-RR, one motor 110-R that is associated with the corners 106-RL, 106-RR that are coupled to rear axle, and two motors 110-FL, 110-FR that are associated with corners 106-FL, 106-FR that are coupled to the front axle, and three energy sources 112-R, 112-FL, 112-FR that are associated with motor 110-R, motor 110-FL, and motor 110-FR, respectively.

Figure 5B:
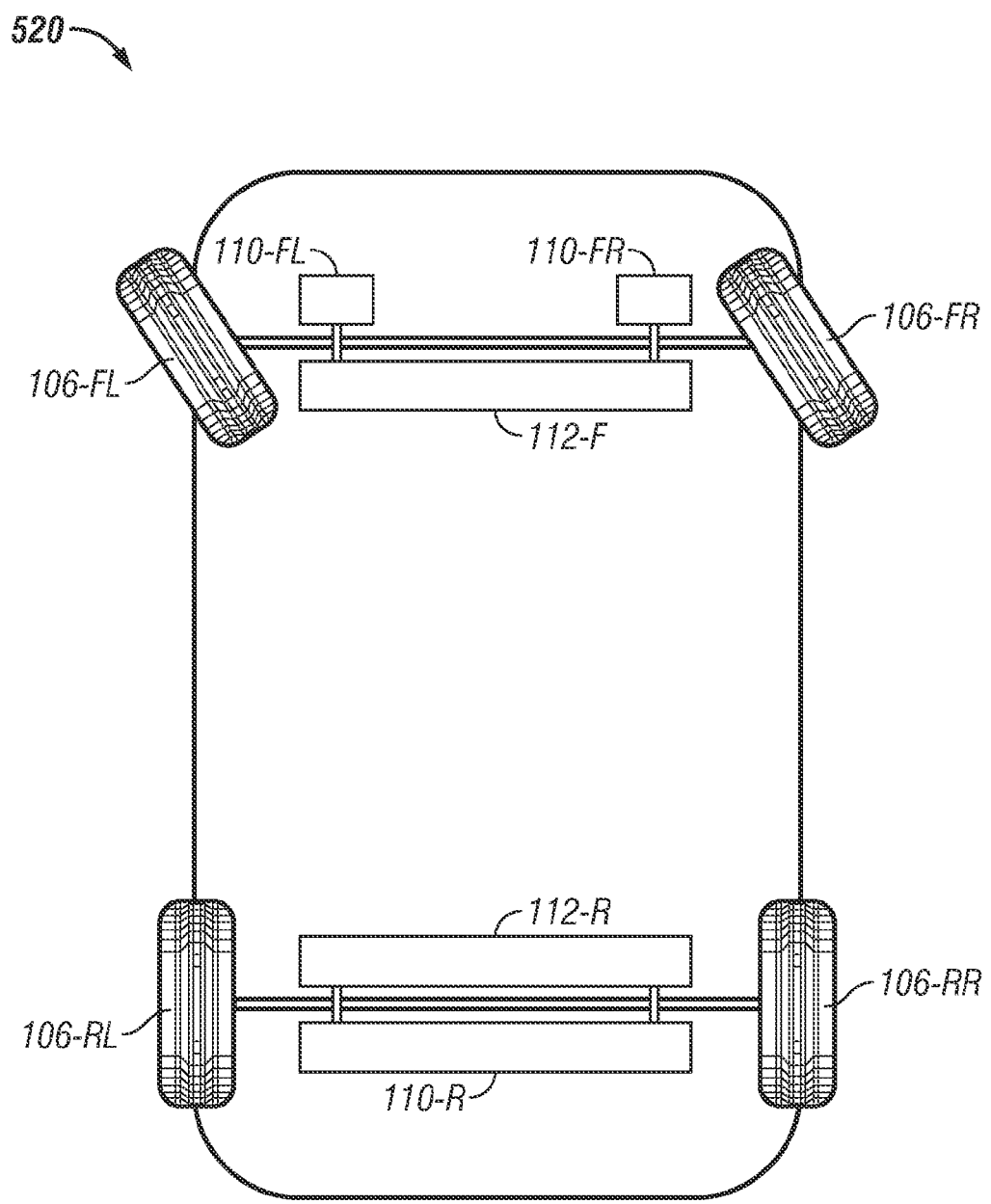

FIG. 5B illustrates an exemplary propulsion system configuration 520 that includes four corners 106-FL, 106-FR, 106-RL, 106-RR, one motor 110-R associated with corners 106-RL, 106-RR that is coupled to the rear axle, and two motors 110-FL, 110-FR associated with corners 106-FL, 106-FR, respectively, that are coupled to the front axle. One energy source 112-F is associated with motors 110-FR, 110-FL, and one energy source 112-R is associated with motor 110-R.

Figure 5C:
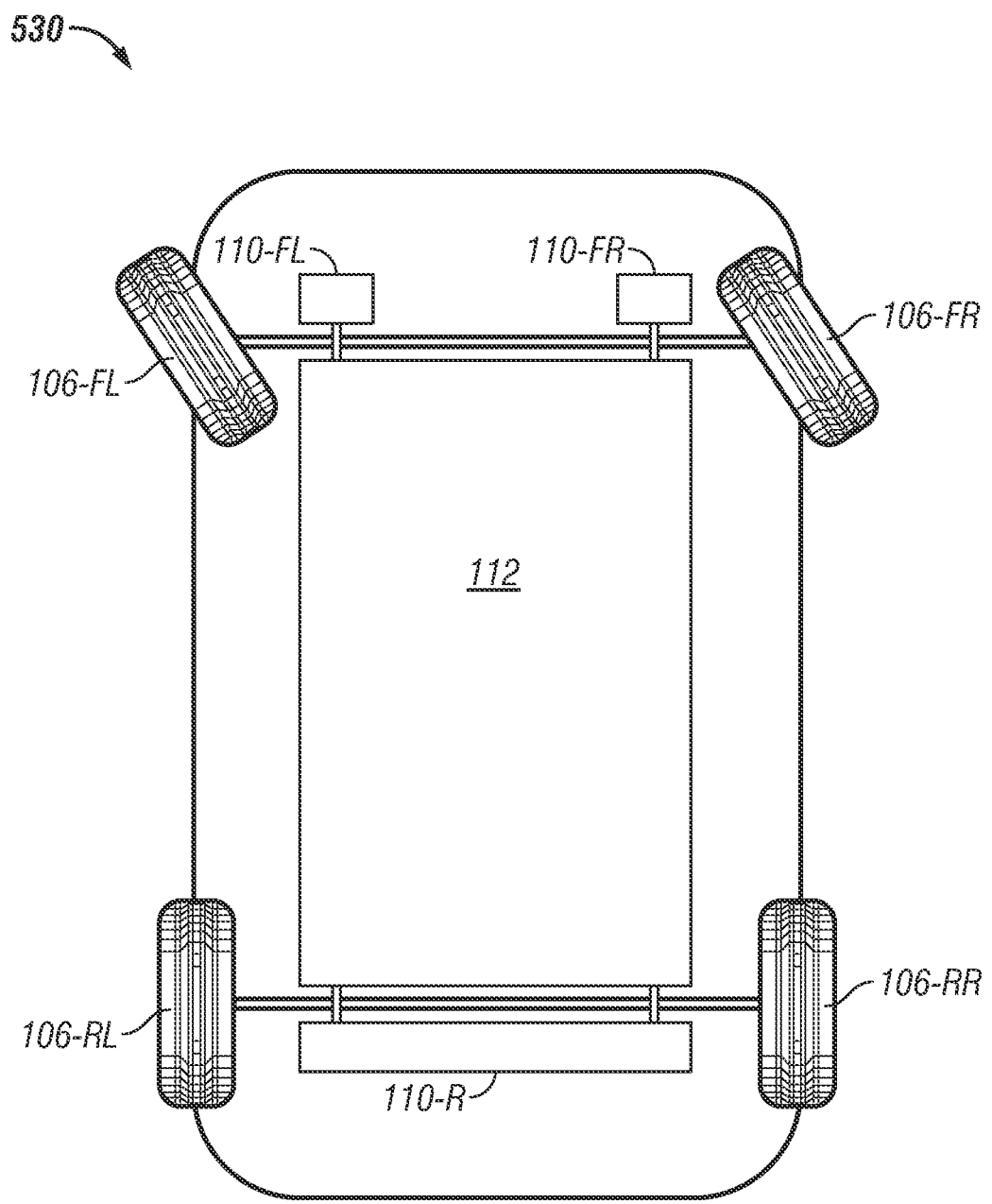

FIG. 5C illustrates an exemplary propulsion system configuration 530 that includes four corners 106-FL, 106-FR, 106-RL, 106-RR, one motor 110-R that is associated with corner 106-RL, 106-RR that are coupled to the rear axle, two motors 110-FL, 110-FR that are associated with corners 106-FL, 106-FR, respectively, that are coupled to the front axle, and one energy source 112 that is associated with each of the three motors 110-R, 110-FL, 110-FR.

Figure 6A:
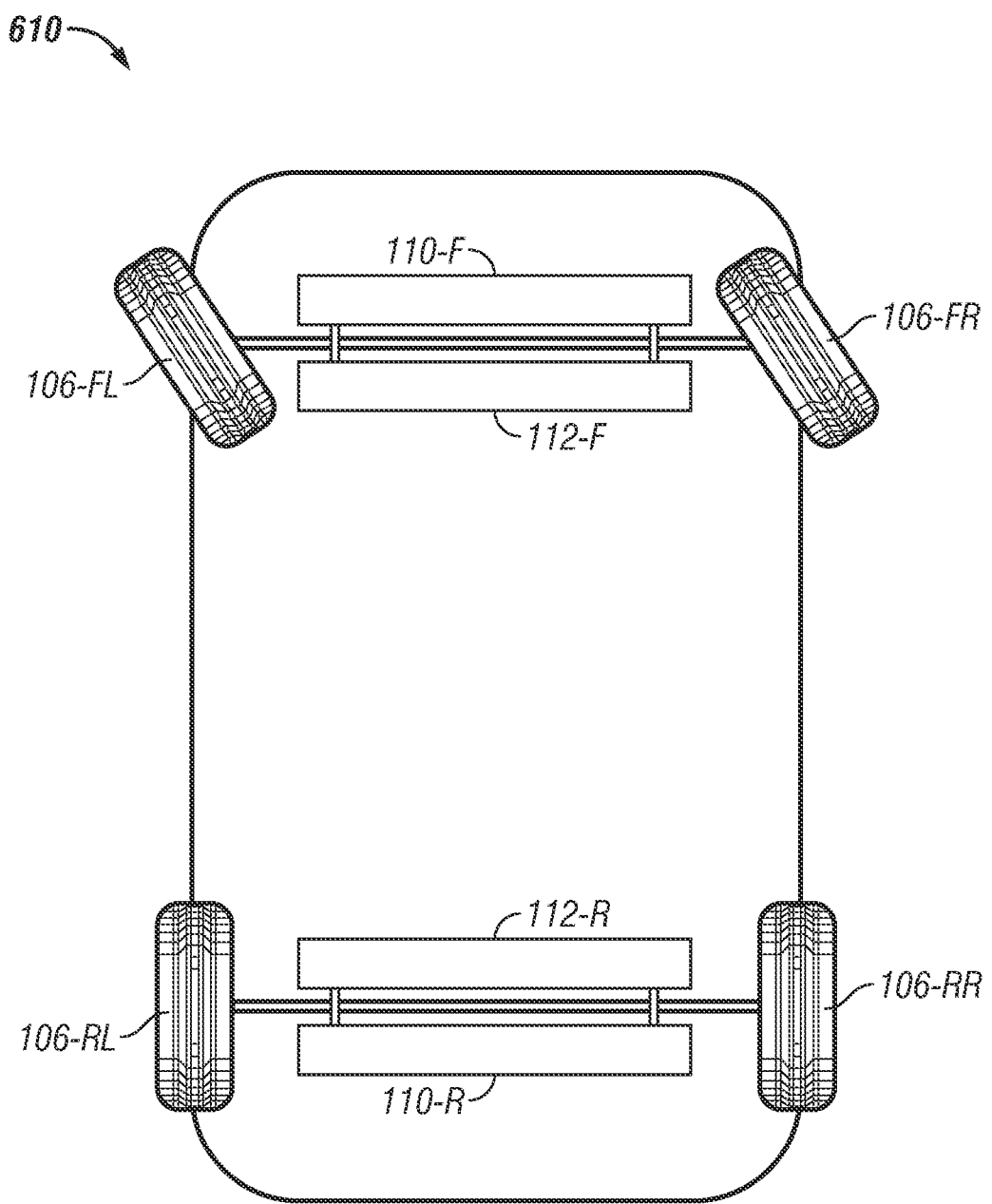

FIG. 6A illustrates an exemplary propulsion system configuration 610 that includes four corners 106-FL, 106-FR, 106-RL, 106-RR, one motor 110-R that is associated with corners 106-RL, 106-RR that are coupled to the rear axle, one motor 110-F that is associated with corners 106-FL, 106-FR that are coupled to the front axle, one energy source 112-F that is associated with motor 110-F, and another energy source 112-R that is associated with motor 110-R.

Figure 6B:
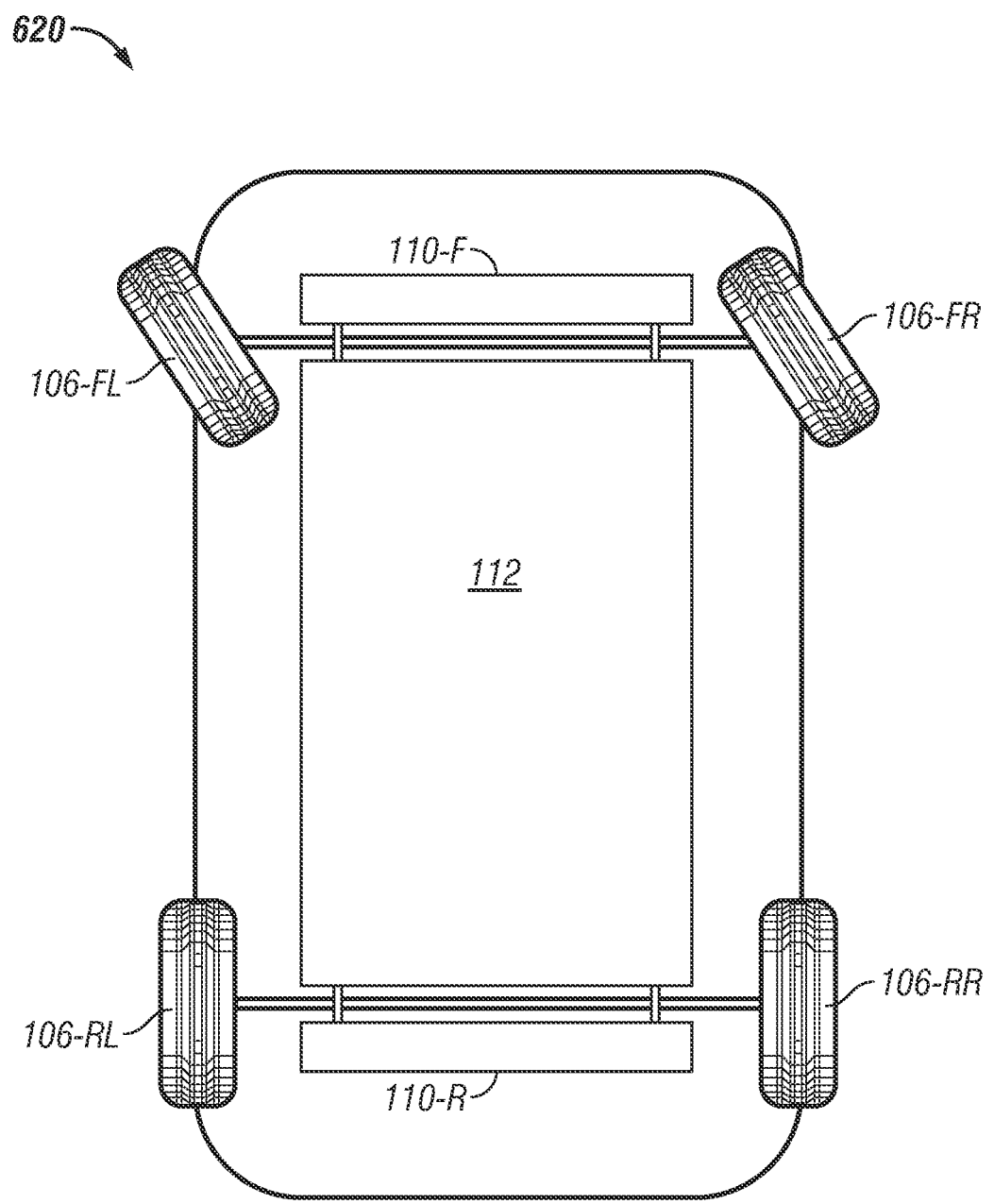

FIG. 6B illustrates an exemplary propulsion system configuration 620 that includes four corners 106-FL, 106-FR, 106-RL, 106-RR, one motor 110-R that is associated with corners 106-RL, 106-RR that are coupled to the rear axle, one motor 110-F that is associated with corners 106-FL, 106-FR, respectively, that are coupled to the front axle, and one energy source 112 that is associated with each of the two motors 110-F, 110-R.

Figure 7A:
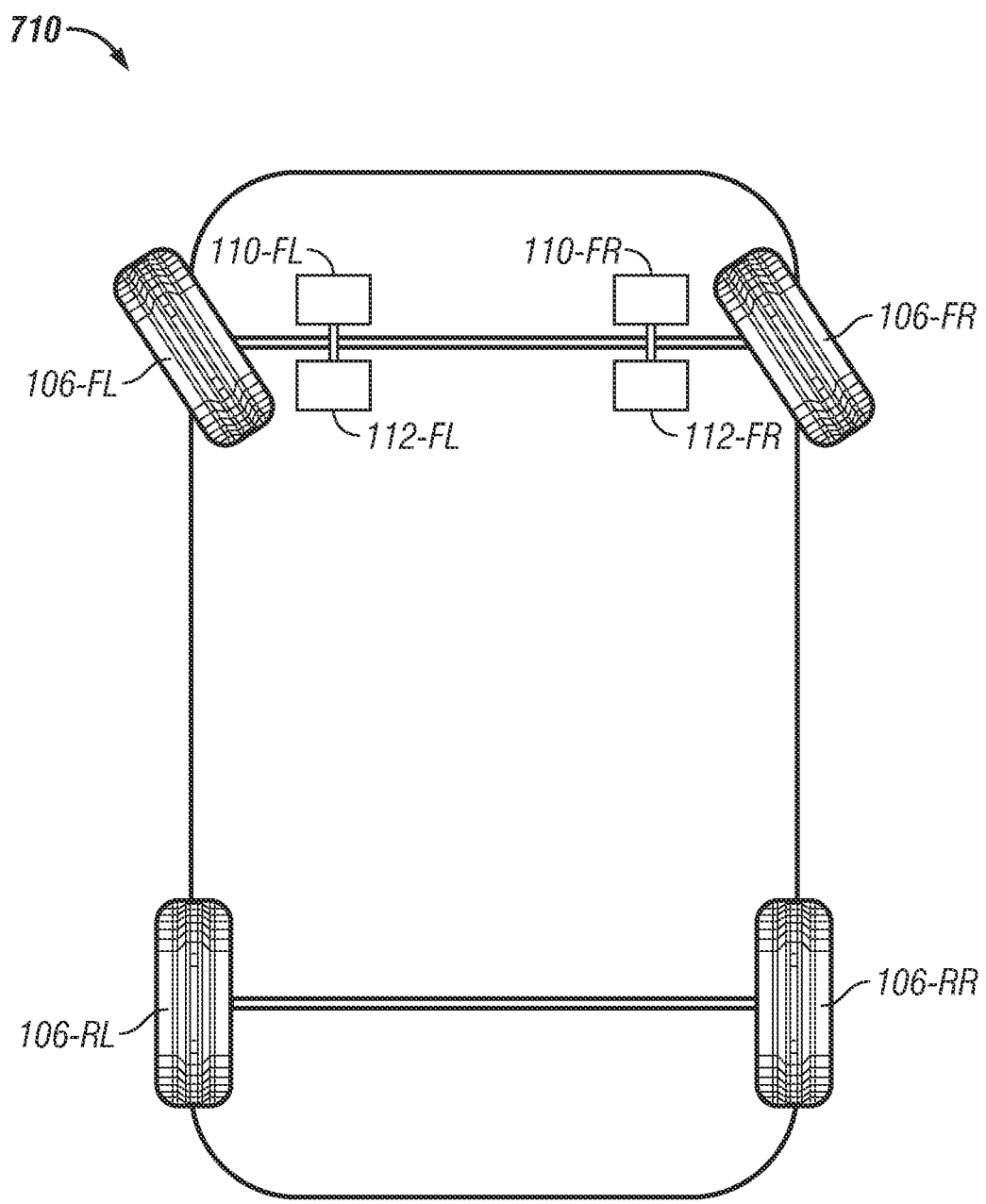

FIG. 7A illustrates an exemplary propulsion system configuration 710 that includes four corners 106-FL, 106-FR, 106-RL, 106-RR, two motors 110-FL, 110-FR that are coupled to corners 106-FL, 106-FR, respectively, and two energy sources 112-FL, 112-FR that are associated with the motors 110-FL, 110-FR, respectively.

Figure 7B:
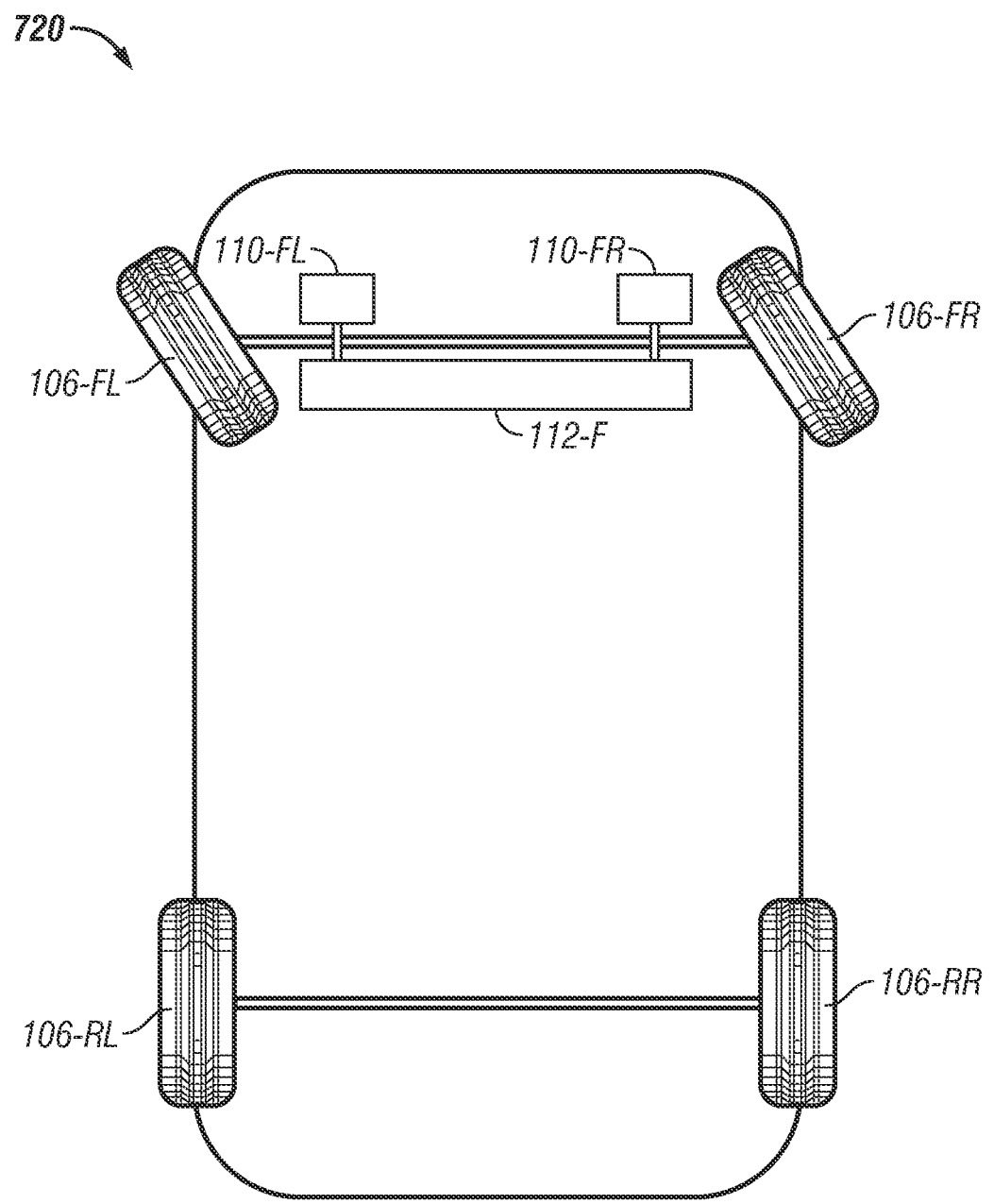

FIG. 7B illustrates an exemplary propulsion system configuration 720 that includes four corners 106-FL, 106-FR, 106-RL, 106-RR, two motors 110-FL, 110-FR that are coupled to corners 106-FL, 106-FR, respectively, and one energy source 112-R that is associated with the motors 110-FL, 110-FR.

Figure 8A:
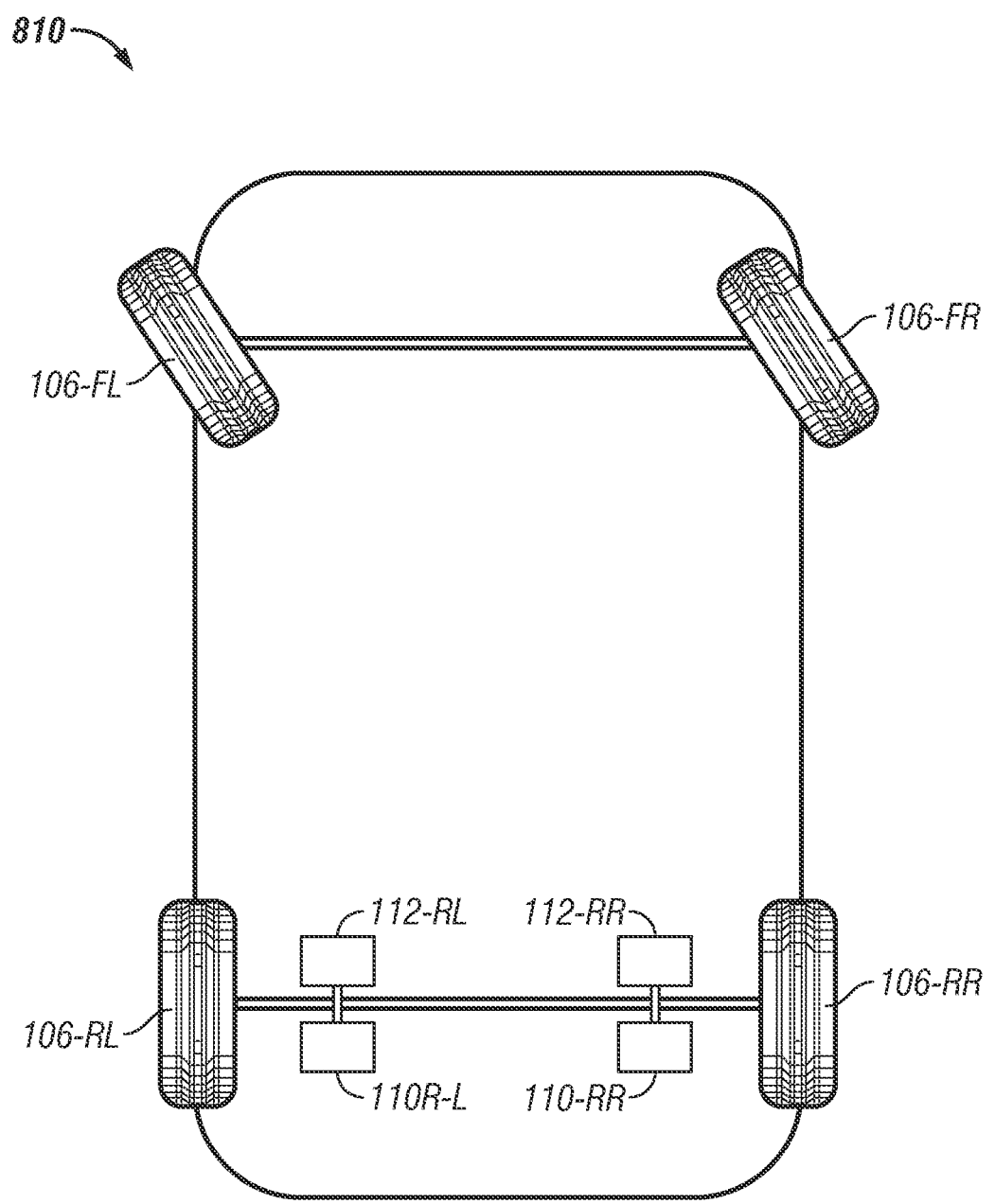

FIG. 8A illustrates an exemplary propulsion system configuration 810 that includes four corners 106-FL, 106-FR, 106-RL, 106-RR, one motor 110-RL that is associated with corner 106-RL that is coupled to the rear axle, one motor 110-RR that is associated with corner 106-RR that is coupled to the rear axle, one energy source 112-RL that is associated with motor 110-RL, and another energy source 112-RR that is associated with motor 110-RR.

Figure 8B:
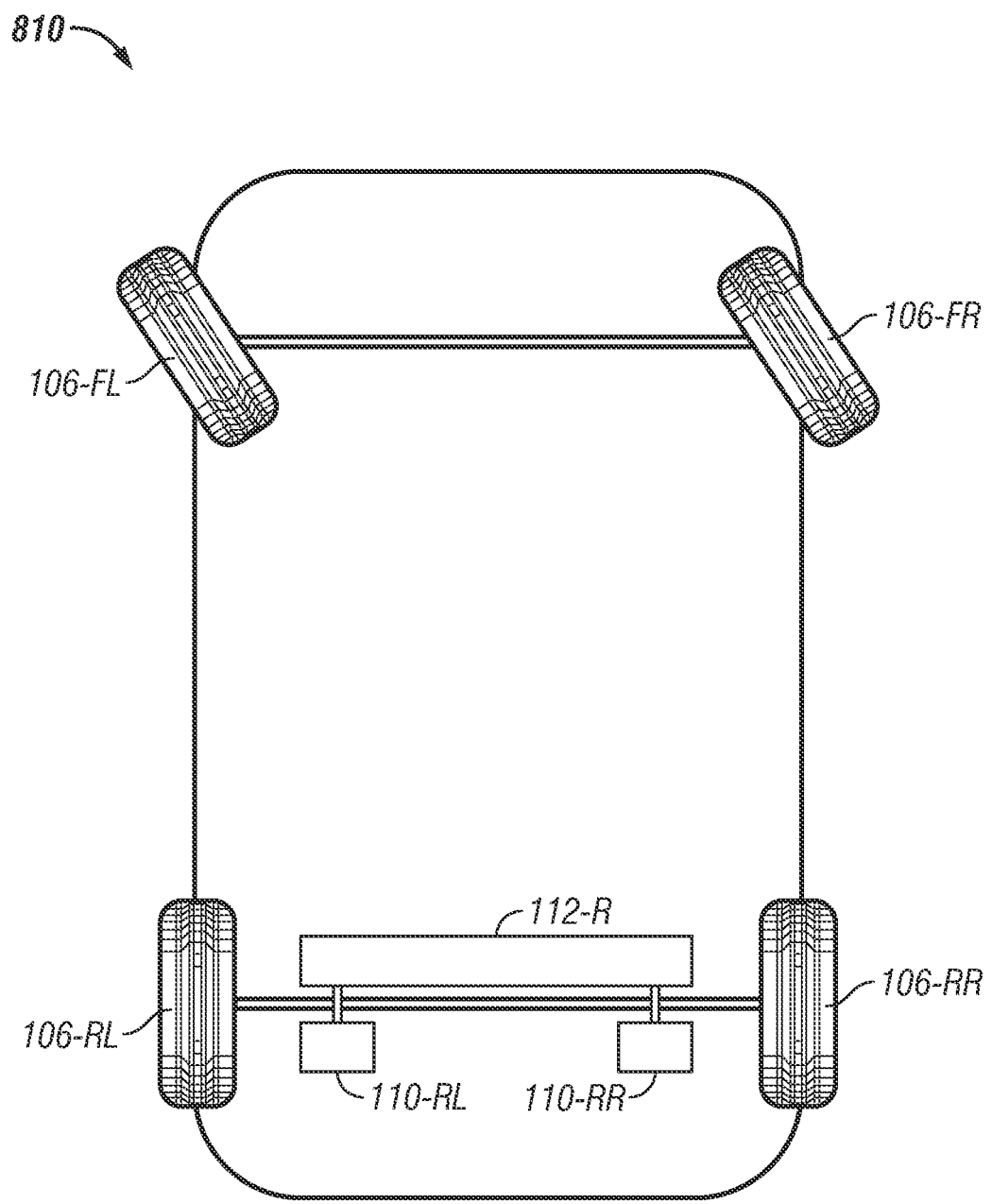

FIG. 8B illustrates an exemplary propulsion system configuration 820 that includes four corners 106-FL, 106-FR, 106-RL, 106-RR, one motor 110-RL that is associated with corner 106-RL that is coupled to the rear axle, one motor 110-RR that is associated with corner 106-RR that are coupled to the rear axle, and one energy source 112-R that is associated with motor 110-RL and to motor 110-RR.

Figure 9:
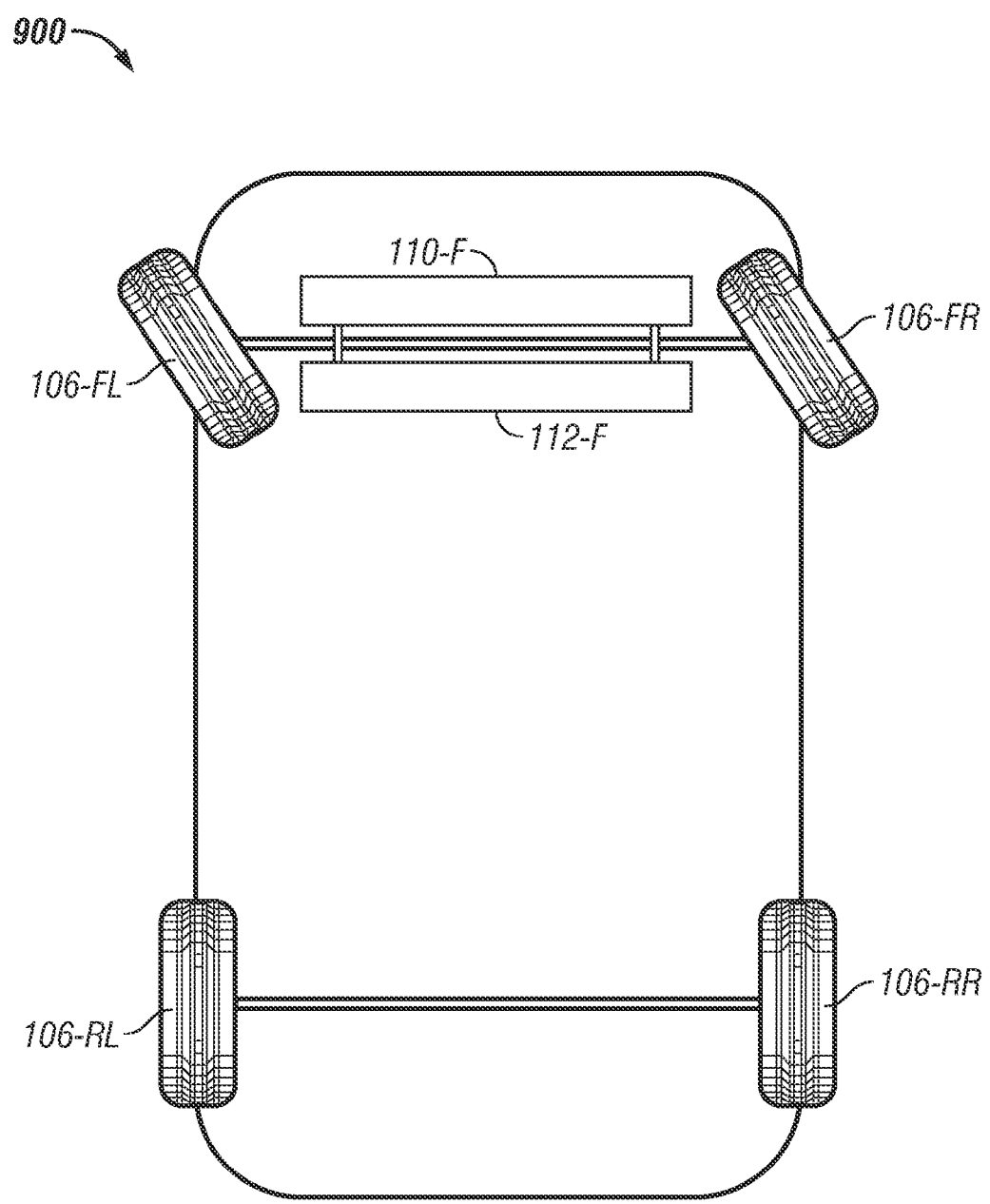

FIG. 9 illustrates an exemplary propulsion system configuration 900 that includes four corners 106-FL, 106-FR, 106-RL, 106-RR, one motor 110-F associated with corners 106-FL, 106-FR that are coupled to the front axle, and one energy source 112-F that is associated with motor 110-F.

Figure 10:
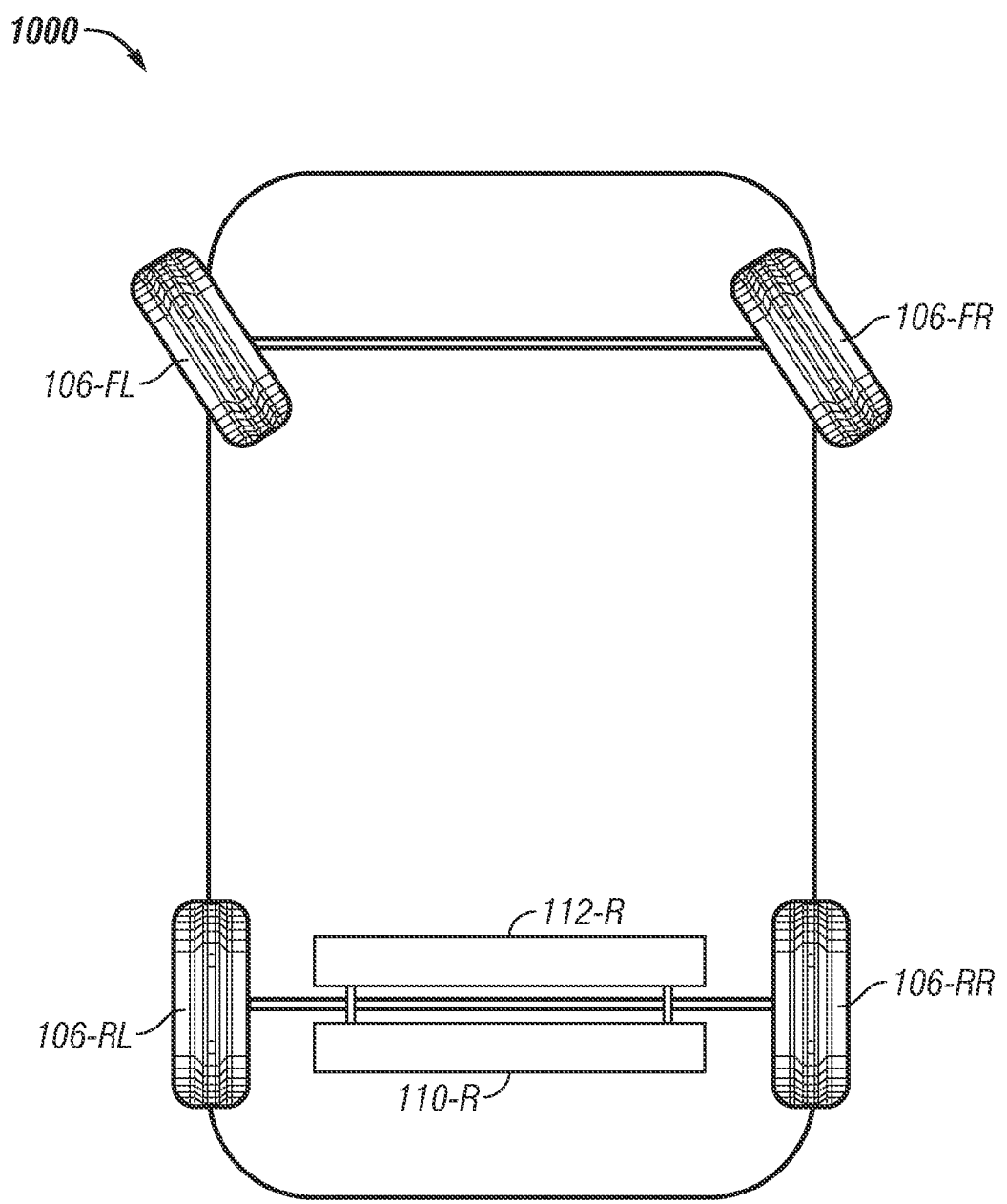

FIG. 10 illustrates an exemplary propulsion system configuration 1000 that includes four corners 106-FL, 106-FR, 106-RL, 106-RR, one motor 110-R associated with corners 106-RL, 106-RR that are coupled to the rear axle, and one energy source 112-R that is associated with motor 110-R.

Exemplary Programmable Arrays

The number of programmable arrays included in a particular generic control software program can vary depending on the particular generic control software program being implemented. A vast number of control software programs can be developed that will be applicable to a given propulsion system, and each control software program can utilize programmable arrays. In many cases, the number of programmable arrays is dictated by the number of different propulsion system components, and the relationship between each of the components.

For instance, one exemplary implementation of the generic control software will now be described below that employs four programmable arrays used to configure the generic control software as custom control software that can be used to control different propulsion systems that are illustrated in FIGS. 3A through 10.

In this exemplary implementation, the four programmable arrays used in the generic control software are adequate to cover each of the different propulsion system configurations that are illustrated in FIGS. 3A through 10. The four programmable arrays allow up to four energy sources 112 (e.g., batteries) to supply up to four motors 110, with more than one motor 110 attached to an energy source 112. Each motor 110 can then be assigned to any corner 106 with the ability of one motor 110 to be connected to more than one corner 106.

In this one particular, non-limiting, exemplary embodiment, the four programmable arrays that can be used in generic control software include: a first programmable array (MotorAssignments), a second programmable array (EnergySourceAssignments), a third programmable array (NumWhlCornersPerMtr), and a fourth programmable array (NumMotorsPerEnergySource).

The first programmable array (MotorAssignments) defines which motor 110 is associated with each corner 106 (e.g., front left, front right, rear left, rear right). For example, a vehicle with one motor on the front left corner and one motor on the front right corner, as shown in FIGS. 7A and 7B, would have a first programmable array (MotorAssignments) populated as follows:

MotorAssignments [FrontLeft]=Motor1
MotorAssignments [FrontRight]=Motor2
MotorAssignments [RearLeft]=NoMotorAssigned
MotorAssignments [RearRight]=NoMotorAssigned, where: FrontLeft, FrontRight, RearLeft and RearRight are constant values (e.g. 0, 1, 2, 3) representing each of the vehicle corners, Motor1, Motor2 are constant values (e.g. 0, 1) representing the motors available to supply propulsion to the vehicle, and NoMotorAssigned is a constant value (e.g. 255) used to indicate that no motor is associated with a particular vehicle corner.

The second programmable array (EnergySourceAssignments) defines which energy source 112 (e.g., battery) is associated with each of the motors 110. For example, a vehicle with one motor on the front left corner, one motor on the front right corner, and one energy source per motor, as shown in FIG. 7A, would have a second programmable array (EnergySourceAssignments) populated as follows:

EnergySourceAssignments [Motor1]=EnergySource1
EnergySourceAssignments [Motor2]=EnergySource2
EnergySourceAssignments [Motor3]=NoEnergySourceAssigned
EnergySourceAssignments [Motor4]=NoEnergySourceAssigned, where: Motor1, Motor2, Motor3 and Motor4 are constant values (e.g. 0, 1, 2, 3) representing the maximum number of motors supported by the calibration strategy, EnergySource1 and EnergySource2 are constant values (e.g. 0, 1) representing each of the energy sources available to source/sink current to/from the motors, and NoEnergySourceAssigned is a constant value (e.g. 255) used to populate array components associated with motors that are not installed on the vehicle.

The third programmable array (NumWhlCornersPerMtr) defines a number of corners 106 (e.g. front left, front right, rear left, rear right) serviced by each of the motors 110 available to supply that propulsion system for propulsion of the vehicle. For example, a vehicle with one motor per corner, as shown in FIGS. 3A-3E, would have a third programmable array populated as follows:

NumWhlCornersPerMtr[Motor1]=1
NumWhlCornersPerMtr[Motor2]=1
NumWhlCornersPerMtr[Motor3]=1
NumWhlCornersPerMtr[Motor4]=1, where: Motor1, Motor2, Motor3 and Motor4 are constant values (e.g. 0, 1, 2, 3) representing each of the motors available to supply propulsion to the vehicle.

The fourth programmable array (NumMotorsPerEnergySource) defines a number of motors 110 serviced by each energy source 112. For example, a vehicle equipped with four motors, one energy source to supply the two front motors, and one energy source to supply the two rear motors, as shown in FIG. 3B, would have the programmable array populated as follows:

NumMotorsPerEnergySource [EnergySource1]=2
NumMotorsPerEnergySource [EnergySource2]=2
NumMotorsPerEnergySource [EnergySource3]=0
NumMotorsPerEnergySource [EnergySource4]=0, where: EnergySource1, EnergySource2, EnergySource3 and EnergySource4 are constant values representing each of the energy sources that is available to source/sink current to/from the motors (e.g., 0, 1, 2, 3).

It is noted that the size of the first programmable array (MotorAssignments) can be adjusted as required to accommodate vehicles with any number of corners, and that the size of the second programmable array (EnergySourceAssignments) can be adjusted as required to accommodate vehicles with any number of batteries. In addition, the number of corners serviced by each motor can also be determined computationally based on the calibrated state of the first programmable array (MotorAssignments), but the third programmable array (NumWhlCornersPerMtr) is used to reduce microprocessor burden. Similarly, the number of motors serviced by each energy source can also be determined computationally based on the calibrated state of the second programmable array (EnergySourceAssignments), but the fourth programmable array (NumMotorsPerEnergySource) is used to reduce microprocessor burden.

Exemplary Programmable Arrays Programmed with Values for Characterizing Motor and Energy Source Content of Each Propulsion System Architecture Illustrated in FIGS. 3A-10

For sake of completeness, exemplary programming of the programmable arrays (e.g., in the format of configuration tables) used to define features of the propulsion system configurations illustrated in FIGS. 3A-10 is provided below. The format of the programmable arrays that is used in Tables 1-19 is exemplary, and a wide variety of other formats can be utilized to convey the same information.

Table 1, that corresponds to the propulsion system architecture illustrated in FIG. 3A, illustrates specific values that can be input or programmed into the programmable arrays for an exemplary instance of a propulsion system configuration 310 that includes four corners 106-FL, 106-FR, 106-RL, 106-RR, four motors 110-FL, 110-FR, 110-RL, 110-RR (one for each corner), and four energy sources 112-FL, 112-FR, 112-RL, 112-RR that are associated with the motors 110-FL, 110-FR, 110-RL, 110-RR, respectively.

TABLE 1

| MotorAssignments Wheel Corner | | | |
|---|---|---|---|
| FL | FR | RL | RR |
| Motor1 | Motor2 | Motor3 | Motor4 |
| EnergySourceAssignments Motor | | | |
| Motor1 | Motor2 | Motor3 | Motor4 |
| EnergySource1 | EnergySource2 | EnergySource3 | EnergySource4 |
| NumWhlCornersPerMtr Motor | | | |
| Motor1 | Motor2 | Motor3 | Motor4 |
| 1 | 1 | 1 | 1 |
| NumMotorsPerEnergySource Energy Source | | | |
| EnergySource1 | EnergySource2 | EnergySource3 | EnergySource4 |
| 1 | 1 | 1 | 1 |

Table 2, that corresponds to the propulsion system architecture illustrated in FIG. 3B, illustrates specific values that can be input or programmed into the programmable arrays for an exemplary instance of a propulsion system configuration 320 that includes four corners 106-FL, 106-FR, 106-RL, 106-RR, four motors 110-FL, 110-FR, 110-RL, 110-RR (one for each corner), and two energy sources 112-F, 112-R that are associated with the motors 110-FL, 110-FR, and motors 110-RL, 110-RR, respectively.

TABLE 2

| MotorAssignments Wheel Corner | | | |
|---|---|---|---|
| FL | FR | RL | RR |
| Motor1 | Motor2 | Motor3 | Motor4 |
| EnergySourceAssignments Motor | | | |
| Motor1 | Motor2 | Motor3 | Motor4 |
| EnergySource1 | EnergySource1 | EnergySource2 | EnergySource2 |
| NumWhlCornersPerMtr Motor | | | |
| Motor1 | Motor2 | Motor3 | Motor4 |
| 1 | 1 | 1 | 1 |
| NumMotorsPerEnergySource Energy Source | | | |
| EnergySource1 | EnergySource2 | EnergySource3 | EnergySource4 |
| 2 | 2 | 0 | 0 |

Table 3, that corresponds to the propulsion system architecture illustrated in FIG. 3C, illustrates specific values that can be input or programmed into the programmable arrays for an exemplary instance of a propulsion system configuration 330 that includes four corners 106-FL, 106-FR, 106-RL, 106-RR, four motors 110-FL, 110-FR, 110-RL, 110-RR (one for each corner), and one energy source 112 that is associated with each of the motors 110-FL, 110-FR, 110-RL, 110-RR.

TABLE 3

| MotorAssignments Wheel Corner | | | |
|---|---|---|---|
| FL | FR | RL | RR |
| Motor1 | Motor2 | Motor3 | Motor4 |
| EnergySourceAssignments Motor | | | |
| Motor1 | Motor2 | Motor3 | Motor4 |
| EnergySource1 | EnergySource1 | EnergySource1 | EnergySource1 |
| NumWhlCornersPerMtr Motor | | | |
| Motor1 | Motor2 | Motor3 | Motor4 |
| 1 | 1 | 1 | 1 |
| NumMotorsPerEnergySource Energy Source | | | |
| EnergySource1 | EnergySource2 | EnergySource3 | EnergySource4 |
| 4 | 0 | 0 | 0 |

Table 4, that corresponds to the propulsion system architecture illustrated in FIG. 3D, illustrates specific values that can be input or programmed into the programmable arrays for an exemplary instance of a propulsion system configuration 340 that includes four corners 106-FL, 106-FR, 106-RL, 106-RR, four motors 110-FL, 110-FR, 110-RL, 110-RR (one for each corner), and three energy sources 112-FL, 112-FR, 112-R that are associated with motor 110-FL, motor 110-FR, and motors 110-RL, 110-RR, respectively.

TABLE 4

| MotorAssignments Wheel Corner | | | |
|---|---|---|---|
| FL | FR | RL | RR |
| Motor1 | Motor2 | Motor3 | Motor4 |
| EnergySourceAssignments Motor | | | |
| Motor1 | Motor2 | Motor3 | Motor4 |
| EnergySource1 | EnergySource2 | EnergySource3 | EnergySource3 |
| NumWhlCornersPerMtr Motor | | | |
| Motor1 | Motor2 | Motor3 | Motor4 |
| 1 | 1 | 1 | 1 |
| NumMotorsPerEnergySource Energy Source | | | |
| EnergySource1 | EnergySource2 | EnergySource3 | EnergySource4 |
| 1 | 1 | 2 | 0 |

Table 5, that corresponds to the propulsion system architecture illustrated in FIG. 3E, illustrates specific values that can be input or programmed into the programmable arrays for an exemplary instance of a propulsion system configuration 350 that includes four corners 106-FL, 106-FR, 106-RL, 106-RR, four motors 110-FL, 110-FR, 110-RL, 110-RR (one for each corner), and three energy sources 112-F, 112-RL, 112-RR that are associated with motors 110-FL, 110-FR, motor 110-RL, and motor 110-RR, respectively. The motor 110-FL is associated with corner 106-FL, the motor 110-FR is associated with corner 106-FR, the motor 110-RL is associated with corner 106-RL, and the motor 110-RR is associated with corner 106-RR.

TABLE 5

| Wheel Corner | | | |
|---|---|---|---|
| FL | FR | RL | RR |
| Motor1 | Motor2 | Motor3 | Motor4 |
| EnergySourceAssignments Motor | | | |
| Motor1 | Motor2 | Motor3 | Motor4 |
| EnergySource1 | EnergySource1 | EnergySource2 | EnergySource3 |
| NumWhlCornersPerMtr Motor | | | |
| Motor1 | Motor2 | Motor3 | Motor4 |
| 1 | 1 | 1 | 1 |
| NumMotorsPerEnergySource Energy Source | | | |
| EnergySource1 | EnergySource2 | EnergySource3 | EnergySource4 |
| 2 | 1 | 1 | 0 |

Table 6, that corresponds to the propulsion system architecture illustrated in FIG. 4A, illustrates specific values that can be input or programmed into the programmable arrays for an exemplary instance of a propulsion system configuration 410 that includes four corners 106-FL, 106-FR, 106-RL, 106-RR, one motor 110-F associated with the front axle and two motors 110-RL, 110-RR that are associated with corners 106-RL, 106-RR that are coupled to the rear axle, and three energy sources 112-F, 112-RL, 112-RR that are associated with motor 110-F, motor 110-RL, and motor 110-RR, respectively.

TABLE 6

| MotorAssignments Wheel Corner | | | |
|---|---|---|---|
| FL | FR | RL | RR |
| Motor1 | Motor1 | Motor2 | Motor3 |
| EnergySourceAssignments Motor | | | |
| Motor1 | Motor2 | Motor3 | Motor4 |
| EnergySource1 | EnergySource2 | EnergySource3 | NoEnergySource-Assigned |
| NumWhlCornersPerMtr Motor | | | |
| Motor1 | Motor2 | Motor3 | Motor4 |

TABLE 6-continued

| 2 | 1 | 1 | 0 |
|---|---|---|---|
| NumMotorsPerEnergySource Energy Source | | | |
| EnergySource1 | EnergySource2 | EnergySource3 | EnergySource4 |
| 1 | 1 | 1 | 0 |

Table 7, that corresponds to the propulsion system architecture illustrated in FIG. 4B, illustrates specific values that can be input or programmed into the programmable arrays for an exemplary instance of a propulsion system configuration 420 that includes four corners 106-FL, 106-FR, 106-RL, 106-RR, one motor 110-F associated with the front axle and two motors 110-RL, 110-RR associated with corners 106-RL, 106-RR that are coupled to the rear axle, and two energy sources 112-F, 112-R that are associated with motor 110-F, and motors 110-RL, 110-RR, respectively.

TABLE 7

| MotorAssignments Wheel Corner | | | |
|---|---|---|---|
| FL | FR | RL | RR |
| Motor1 | Motor1 | Motor2 | Motor3 |
| EnergySourceAssignments Motor | | | |
| Motor1 | Motor2 | Motor3 | Motor4 |
| EnergySource1 | EnergySource2 | EnergySource2 | NoEnergySource-Assigned |
| NumWhlCornersPerMtr Motor | | | |
| Motor1 | Motor2 | Motor3 | Motor4 |
| 2 | 1 | 1 | 0 |
| NumMotorsPerEnergySource Energy Source | | | |
| EnergySource1 | EnergySource2 | EnergySource3 | EnergySource4 |
| 1 | 2 | 0 | 0 |

Table 8, that corresponds to the propulsion system architecture illustrated in FIG. 4C, illustrates specific values that can be input or programmed into the programmable arrays for an exemplary instance of a propulsion system configuration 430 that includes four corners 106-FL, 106-FR, 106-RL, 106-RR, one motor 110-F associated with the front axle and two motors 110-RL, 110-RR that are associated with corners 106-RL, 106-RR that are coupled to the rear axle, and one energy source 112 that is associated with each of motors 110-F, 110-RL, 110-RR.

TABLE 8

| MotorAssignments Wheel Corner | | | |
|---|---|---|---|
| FL | FR | RL | RR |
| Motor1 | Motor1 | Motor2 | Motor3 |
| EnergySourceAssignments Motor | | | |
| Motor1 | Motor2 | Motor3 | Motor4 |
| EnergySource1 | EnergySource1 | EnergySource1 | NoEnergySource-Assigned |
| NumWhlCornersPerMtr Motor | | | |
| Motor1 | Motor2 | Motor3 | Motor4 |
| 2 | 1 | 1 | 0 |
| NumMotorsPerEnergySource Energy Source | | | |
| EnergySource1 | EnergySource2 | EnergySource3 | EnergySource4 |
| 3 | 0 | 0 | 0 |

Table 9, that corresponds to the propulsion system architecture illustrated in FIG. 5A, illustrates specific values that can be input or programmed into the programmable arrays for an exemplary instance of a propulsion system configuration 510 that includes four corners 106-FL, 106-FR, 106-RL, 106-RR, one motor 110-R that is associated with the corners 106-RL, 106-RR that are on rear axle, and two motors 110-FL, 110-FR that are associated with corners 106-FL, 106-FR that are coupled to the front axle, and three energy sources 112-R, 112-FL, 112-FR that are associated with motor 110-R, motor 110-FL, and motor 110-FR, respectively.

TABLE 9

| MotorAssignments Wheel Corner | | | |
|---|---|---|---|
| FL | FR | RL | RR |
| Motor1 | Motor2 | Motor3 | Motor3 |
| EnergySourceAssignments Motor | | | |
| Motor1 | Motor2 | Motor3 | Motor4 |
| EnergySource1 | EnergySource2 | EnergySource3 | NoEnergySource-Assigned |
| NumWhlCornersPerMtr Motor | | | |
| Motor1 | Motor2 | Motor3 | Motor4 |
| 1 | 1 | 2 | 0 |
| NumMotorsPerEnergySource Energy Source | | | |
| EnergySource1 | EnergySource2 | EnergySource3 | EnergySource4 |
| 1 | 1 | 1 | 0 |

Table 10, that corresponds to the propulsion system architecture illustrated in FIG. 5B, illustrates specific values that can be input or programmed into the programmable arrays for an exemplary instance of a propulsion system configuration 520 that includes four corners 106-FL, 106-FR, 106-RL, 106-RR, one motor 110-R associated with corners 106-RL, 106-RR that are coupled to the rear axle, and two motors 110-FL, 110-FR associated with corners 106-FL, 106-FRR, respectively, that are coupled to the front axle. One energy source 112-F is associated with motors 110-FR, 110-FL, and one energy source 112-R is associated with motor 110-R.

TABLE 10

| MotorAssignments Wheel Corner | | | |
|---|---|---|---|
| FL | FR | RL | RR |
| Motor1 | Motor2 | Motor3 | Motor3 |
| EnergySourceAssignments Motor | | | |
| Motor1 | Motor2 | Motor3 | Motor4 |
| EnergySource1 | EnergySource1 | EnergySource2 | NoEnergySource-Assigned |
| NumWhlCornersPerMtr Motor | | | |
| Motor1 | Motor2 | Motor3 | Motor4 |
| 1 | 1 | 2 | 0 |
| NumMotorsPerEnergySource Energy Source | | | |
| EnergySource1 | EnergySource2 | EnergySource3 | EnergySource4 |
| 2 | 1 | 0 | 0 |

Table 11, that corresponds to the propulsion system architecture illustrated in FIG. 5C, illustrates specific values that can be input or programmed into the programmable arrays for an exemplary instance of a propulsion system configuration 530 that includes four corners 106-FL, 106-FR, 106-RL, 106-RR, two motors 110-FL, 110-FR that are associated with corners 106-FL, 106-FR, respectively, that are coupled to the front axle, one motor 110-R that is associated with corners 106-RR, 106-RL, and one energy source 112 that is associated with each of the three motors 110-R, 110-FL, 110-FR.

TABLE 11

| MotorAssignments Wheel Corner | | | |
|---|---|---|---|
| FL | FR | RL | RR |
| Motor1 | Motor2 | Motor3 | Motor3 |
| EnergySourceAssignments Motor | | | |
| Motor1 | Motor2 | Motor3 | Motor4 |
| EnergySource1 | EnergySource1 | EnergySource1 | NoEnergySource-Assigned |
| NumWhlCornersPerMtr Motor | | | |
| Motor1 | Motor2 | Motor3 | Motor4 |
| 1 | 1 | 2 | 0 |
| NumMotorsPerEnergySource Energy Source | | | |
| EnergySource1 | EnergySource2 | EnergySource3 | EnergySource4 |
| 3 | 0 | 0 | 0 |

Table 12, that corresponds to the propulsion system architecture illustrated in FIG. 6A, illustrates specific values that can be input or programmed into the programmable arrays for an exemplary instance of a propulsion system configuration 610 that includes four corners 106-FL, 106-FR, 106-RL, 106-RR, one motor 110-R that is associated with corners 106-RL, 106-RR that are coupled to the rear axle, one motor 110-F that is associated with corners 106-FL, 106-FR that are coupled to the front axle, one energy source 112-F that is associated with motor 110-F, and another energy source 112-R that is associated with motor 110-R.

TABLE 12

| MotorAssignments Wheel Corner | | | |
|---|---|---|---|
| FL | FR | RL | RR |
| Motor1 | Motor1 | Motor2 | Motor2 |
| EnergySourceAssignments Motor | | | |
| Motor1 | Motor2 | Motor3 | Motor4 |
| EnergySource1 | EnergySource2 | NoEnergySourceAssigned | NoEnergySourceAssigned |
| NumWhlCornersPerMtr Motor | | | |
| Motor1 | Motor2 | Motor3 | Motor4 |
| 2 | 2 | 0 | 0 |
| NumMotorsPerEnergySource Energy Source | | | |
| EnergySource1 | EnergySource2 | EnergySource3 | EnergySource4 |
| 1 | 1 | 0 | 0 |

Table 13, that corresponds to the propulsion system architecture illustrated in FIG. 6B, illustrates specific values that can be input or programmed into the programmable arrays for an exemplary instance of a propulsion system configuration 620 that includes four corners 106-FL, 106-FR, 106-RL, 106-RR, one motor 110-R that is associated with corners 106-RL, 106-RR that are coupled to the rear axle, one motor 110-F that is associated with corners 106-FL, 106-FR, respectively, that are coupled to the front axle, and one energy source 112 that is associated with each of the two motors 110-F, 110-R.

TABLE 13

| MotorAssignments Wheel Corner | | | |
|---|---|---|---|
| FL | FR | RL | RR |
| Motor1 | Motor1 | Motor2 | Motor2 |
| EnergySourceAssignments Motor | | | |
| Motor1 | Motor2 | Motor3 | Motor4 |
| EnergySource1 | EnergySource1 | NoEnergySourceAssigned | NoEnergySourceAssigned |
| NumWhlCornersPerMtr Motor | | | |
| Motor1 | Motor2 | Motor3 | Motor4 |

TABLE 13-continued

| 2 | 2 | 0 | 0 |
|---|---|---|---|

| NumMotorsPerEnergySource Energy Source | | | |
|---|---|---|---|
| EnergySource1 | EnergySource2 | EnergySource3 | EnergySource4 |
| 2 | 0 | 0 | 0 |

Table 14, that corresponds to the propulsion system architecture illustrated in FIG. 7A, illustrates specific values that can be input or programmed into the programmable arrays for an exemplary instance of a propulsion system configuration 710 that includes four corners 106-FL, 106-FR, 106-RL, 106-RR, two motors 110-FL, 110-FR that are coupled to corners 106-FL, 106-FR, respectively, and two energy sources 112-FL, 112-FR that are associated with the motors 110-FL, 110-FR, respectively.

TABLE 14

| MotorAssignments Wheel Corner | | | |
|---|---|---|---|
| FL | FR | RL | RR |
| Motor1 | Motor2 | NoMotorAssigned | NoMotorAssigned |

| EnergySourceAssignments Motor | | | |
|---|---|---|---|
| Motor1 | Motor2 | Motor3 | Motor4 |
| EnergySource1 | EnergySource2 | NoEnergy-SourceAssigned | NoEnergy-SourceAssigned |

| NumWhlCornersPerMtr Motor | | | |
|---|---|---|---|
| Motor1 | Motor2 | Motor3 | Motor4 |
| 1 | 1 | 0 | 0 |

| NumMotorsPerEnergySource Energy Source | | | |
|---|---|---|---|
| EnergySource1 | EnergySource2 | EnergySource3 | EnergySource4 |
| 1 | 1 | 0 | 0 |

Table 15, that corresponds to the propulsion system architecture illustrated in FIG. 7B, illustrates specific values that can be input or programmed into the programmable arrays for an exemplary instance of a propulsion system configuration 720 that includes four corners 106-FL, 106-FR, 106-RL, 106-RR, two motors 110-FL, 110-FR, and one energy source 112-R that is associated with the motors 110-FL, 110-FR.

TABLE 15

| MotorAssignments Wheel Corner | | | |
|---|---|---|---|
| FL | FR | RL | RR |
| Motor1 | Motor2 | NoMotorAssigned | NoMotorAssigned |

| EnergySourceAssignments Motor | | | |
|---|---|---|---|
| Motor1 | Motor2 | Motor3 | Motor4 |
| EnergySource1 | EnergySource1 | NoEnergy-SourceAssigned | NoEnergy-SourceAssigned |

| NumWhlCornersPerMtr Motor | | | |
|---|---|---|---|
| Motor1 | Motor2 | Motor3 | Motor4 |
| 1 | 1 | 0 | 0 |

| NumMotorsPerEnergySource Energy Source | | | |
|---|---|---|---|
| EnergySource1 | EnergySource2 | EnergySource3 | EnergySource4 |
| 2 | 0 | 0 | 0 |

Table 16, that corresponds to the propulsion system architecture illustrated in FIG. 8A, illustrates specific values that can be input or programmed into the programmable arrays for an exemplary instance of a propulsion system configuration 810 that includes four corners 106-FL, 106-FR, 106-RL, 106-RR, one motor 110-RL that is associated with corner 106-RL that is coupled to the rear axle, one motor 110-RR that is associated with corner 106-RR that is coupled to the rear axle, one energy source 112-RL that is associated with motor 110-RL, and another energy source 112-RR that is associated with motor 110-RR.

TABLE 16

| MotorAssignments Wheel Corner | | | |
|---|---|---|---|
| FL | FR | RL | RR |
| NoMotorAssigned | NoMotorAssigned | Motor1 | Motor2 |

| EnergySourceAssignments Motor | | | |
|---|---|---|---|
| Motor1 | Motor2 | Motor3 | Motor4 |
| EnergySource1 | EnergySource2 | NoEnergy-SourceAssigned | NoEnergy-SourceAssigned |

| NumWhlCornersPerMtr Motor | | | |
|---|---|---|---|
| Motor1 | Motor2 | Motor3 | Motor4 |
| 1 | 1 | 0 | 0 |

| NumMotorsPerEnergySource Energy Source | | | |
|---|---|---|---|
| EnergySource1 | EnergySource2 | EnergySource3 | EnergySource4 |
| 1 | 1 | 0 | 0 |

Table 17, that corresponds to the propulsion system architecture illustrated in FIG. 8B, illustrates specific values that can be input or programmed into the programmable arrays for an exemplary instance of a propulsion system configuration 820 that includes four corners 106-FL, 106-FR, 106-RL, 106-RR, one motor 110-RL that is associated with corner 106-RL on the rear axle, one motor 110-RR that is associated with corner 106-RR that are coupled to the rear axle, one energy source 112-R that is associated with motors 110-RL, 110-RR.

TABLE 17

| MotorAssignments Wheel Corner | | | |
|---|---|---|---|
| FL | FR | RL | RR |
| NoMotorAssigned | NoMotorAssigned | Motor1 | Motor2 |
| EnergySourceAssignments Motor | | | |
| Motor1 | Motor2 | Motor3 | Motor4 |
| EnergySource1 | EnergySource1 | NoEnergy-SourceAssigned | NoEnergy-SourceAssigned |
| NumWhlCornersPerMtr Motor | | | |
| Motor1 | Motor2 | Motor3 | Motor4 |
| 1 | 1 | 0 | 0 |
| NumMotorsPerEnergySource Energy Source | | | |
| EnergySource1 | EnergySource2 | EnergySource3 | EnergySource4 |
| 2 | 0 | 0 | 0 |

Table 18, that corresponds to the propulsion system architecture illustrated in FIG. 9, illustrates specific values that can be input or programmed into the programmable arrays for an exemplary instance of a propulsion system configuration 900 that includes four corners 106-FL, 106-FR, 106-RL, 106-RR, one motor 110-F associated with corners 106-FL, 106-FR that are coupled to the front axle, and one energy source 112-F that is associated with motor 110-F.

TABLE 18

| MotorAssignments Wheel Corner | | | |
|---|---|---|---|
| FL | FR | RL | RR |
| Motor1 | Motor1 | NoMotorAssigned | NoMotorAssigned |
| EnergySourceAssignments Motor | | | |
| Motor1 | Motor2 | Motor3 | Motor4 |
| EnergySource1 | NoEnergy-SourceAssigned | NoEnergy-SourceAssigned | NoEnergy-SourceAssigned |
| NumWhlCornersPerMtr Motor | | | |
| Motor1 | Motor2 | Motor3 | Motor4 |
| 2 | 0 | 0 | 0 |
| NumMotorsPerEnergySource Energy Source | | | |
| EnergySource1 | EnergySource2 | EnergySource3 | EnergySource4 |
| 1 | 0 | 0 | 0 |

Table 19, that corresponds to the propulsion system architecture illustrated in FIG. 10, illustrates specific values that can be input or programmed into the programmable arrays for an exemplary instance of a propulsion system configuration 1000 that includes four corners 106-FL, 106-FR, 106-RL, 106-RR, one motor 110-R that is associated with corners 106-RL, 106-RR that are coupled to the rear axle, and one energy source 112-R that is associated with motor 110-R.

TABLE 19

| MotorAssignments Wheel Corner | | | |
|---|---|---|---|
| FL | FR | RL | RR |
| NoMotorAssigned | NoMotorAssigned | Motor1 | Motor1 |
| EnergySourceAssignments Motor | | | |
| Motor1 | Motor2 | Motor3 | Motor4 |
| EnergySource1 | NoEnergy-SourceAssigned | NoEnergy-SourceAssigned | NoEnergy-SourceAssigned |
| NumWhlCornersPerMtr Motor | | | |
| Motor1 | Motor2 | Motor3 | Motor4 |
| 2 | 0 | 0 | 0 |
| NumMotorsPerEnergySource Energy Source | | | |
| EnergySource1 | EnergySource2 | EnergySource3 | EnergySource4 |
| 1 | 0 | 0 | 0 |

Although the example implementation specifically addresses a particular example where four programmable arrays are used to characterize electric motor and energy source hardware components of electric vehicle architectures, it will be appreciated by those skilled in the art that additional programmable arrays can be added as needed to accommodate other propulsion system elements as required by particular generic control software.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions described herein. Moreover, the disclosed embodiments can be implemented as a computer-readable storage medium having computer readable code stored thereon for programming a computer (e.g., comprising a processor) to perform a method as described and claimed herein.

Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs (including the generic control software) with minimal experimentation.

Moreover, in this document, the terms "comprises," "comprising," "has", "having," "includes," "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. A device, structure or software entity that is "configured" in a certain way is configured in at least that way, but may also be configured in ways that are not listed.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. For example, although the methods outlined above specifically address development of control software that uses programmable arrays that take into account the electric motor and energy source content of a vehicle, additional programmable arrays can be added to the generic control software to accommodate other propulsion system components as required (e.g. resistive components used for power dissipation during regenerative braking, super capacitors, etc.). When additional propulsion system components are added, then additional programmable arrays would be added to define the number of each additional component and the relationship of each new component to the other propulsion system components.

Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for creating custom control software that is customized for use and designed to operate with a particular propulsion system configuration, the method comprising:
    providing generic control software embodied in a non-transitory computer-readable medium having computer-executable instructions stored thereon, the generic control software being configurable for use with a plurality of different propulsion system configurations, wherein each of the different propulsion system configurations comprises hardware components, wherein each of the different propulsion system configurations has a different configuration of hardware components than other ones of the different propulsion system configurations, and wherein the generic control software comprises a plurality of configuration tables; and
    inputting, via a computer having access to the generic control software, information into the configuration tables that characterizes the particular propulsion system configuration of the plurality of different propulsion system configurations to configure the generic control software into custom control software that is customized for use and designed to operate with the particular propulsion system configuration, wherein the particular propulsion system configuration comprises a particular configuration of particular hardware components, and wherein the information input into the configuration tables comprises: specific values for the particular propulsion system configuration that, when programmed into the configuration tables, define characteristics of the particular hardware component configuration.

2. A method according to claim 1, after being programmed and configured, wherein the custom control software is embodied in a non-transitory computer-readable medium having computer-executable instructions stored thereon, and further comprising:
    executing the computer-executable instructions of the custom control software by a processor in a particular vehicle that is designed to control the particular propulsion system configuration.

3. A method according to claim 1, wherein characteristics of the particular hardware component configuration comprise:
    a type for each of the hardware components in the particular hardware component configuration,
    a number of hardware components for each type of hardware component in the particular hardware component configuration, and
    coupling relationship of each of the hardware components with respect to each other in the particular hardware component configuration.

4. A method according to claim 1, wherein the hardware components for each of the different propulsion system configurations comprise:
    at least one motor of the vehicle,
    at least one energy source of the vehicle,
    a left-front corner of the vehicle, a right-front corner of the vehicle, a left-rear corner of the vehicle, and a right-rear corner of the vehicle.

5. A method according to claim 1, wherein the plurality of configuration tables comprise:
    a first configuration table that defines which motor is assigned to each corner.

6. A method according to claim 5, wherein the plurality of configuration tables further comprise:
    a second configuration table that defines which energy source is assigned to each of the motors.

7. A method according to claim 6, wherein the plurality of configuration tables further comprise:
    a third configuration table that defines a number of corners serviced by each of the motors available to supply that propulsion system for propulsion of the vehicle.

8. A method according to claim 7, wherein the plurality of configuration tables further comprise:
    a fourth configuration table that defines a number of motors serviced by each energy source.

9. A method for creating custom control software that is customized for use and designed to operate with a particular propulsion system configuration of a particular vehicle, the method comprising:
    developing generic control software embodied in a non-transitory computer-readable medium having computer-executable instructions stored thereon, the generic control software being configurable for a plurality of different propulsion system configurations each having different hardware component configurations, wherein the generic control software comprises a plurality of programmable arrays that allow the generic control software to be configured into custom control software that is customized for use and designed to operate with any particular one of the plurality of different propulsion system configurations;

selecting, via a computer having access to the generic control software, the particular propulsion system configuration of the different propulsion system configurations that corresponds to the particular vehicle having the particular hardware component configuration;

determining information that characterizes that particular propulsion system configuration; and programming, via the computer having access to the generic control software, the programmable arrays with the information so that the generic control software is configured into the custom control software that is applicable to and configured to operate with the particular propulsion system configuration of the particular vehicle that has the particular hardware component configuration.

10. A method for creating custom control software for a particular propulsion system configuration of a particular vehicle, comprising:

creating generic control software embodied in a non-transitory computer-readable medium having computer-executable instructions stored thereon, the generic control software being configurable for use with any particular one of a plurality of different propulsion system configurations, wherein each of the different propulsion system configurations has a different configuration of hardware components than other ones of the different propulsion system configurations, and wherein the generic control software comprises a plurality of programmable arrays; and inputting, via a computer having access to the generic control software, information into the programmable arrays that characterizes the particular propulsion system configuration of the plurality of different propulsion system configurations to configure the generic control software into custom control software that is customized for use and designed to operate with the particular propulsion system configuration, wherein the particular propulsion system configuration is a particular one of the different propulsion system configurations that comprises a particular configuration of particular hardware components, wherein the information that characterizes the particular propulsion system configuration, comprises: specific values for the particular propulsion system configuration that, when programmed into the programmable arrays, define characteristics of the particular hardware component configuration.

11. A method according to claim 10, wherein the specific values for the particular propulsion system configuration that, when programmed into the programmable arrays, define characteristics of the particular hardware component configuration include:

a type for each of the hardware components in the particular hardware component configuration, a number of hardware components for each type of hardware component in the particular hardware component configuration, and coupling relationship of each of the hardware components with respect to each other in the particular hardware component configuration.

12. A method according to claim 10, wherein the custom control software is embodied in a non-transitory computer-readable medium having computer-executable instructions stored thereon, and further comprising:

executing the computer-executable instructions of the custom control software by a processor in the particular vehicle that is designed to control the particular propulsion system configuration.

13. A method according to claim 10, wherein the hardware components for each of the different propulsion system configurations comprise:

at least one electric motor of the vehicle, at least one energy source of the vehicle that supplies power to the at least one electric motor, and a left-front corner of the vehicle, a right-front corner of the vehicle, a left-rear corner of the vehicle, and a right-rear corner of the vehicle.

14. A method according to claim 13, wherein the plurality of programmable arrays comprise:

a first programmable array that defines which electric motor is assigned to each corner;

a second programmable array that defines which energy source is assigned to each of the electric motors and supplies power to that particular electric motor;

a third programmable array that defines a number of corners serviced by each of the electric motors available to supply that propulsion system for propulsion of the vehicle; and a fourth programmable array that defines a number of electric motors serviced by each energy source.

15. A method according to claim 10, wherein the generic control software is generically designed to control each of the different propulsion systems regardless of their different propulsion system configurations, and is customized for use with the particular propulsion system configuration only after being programmed and configured into the custom control software that is applicable to the particular propulsion system configuration.

16. A method according to claim 10, wherein each of the plurality of programmable arrays comprises a configuration table.

17. A method for creating custom control software that is customized for use and designed to operate with a particular propulsion system configuration of a particular vehicle, the method comprising:

providing generic control software embodied in a non-transitory computer-readable medium having computer-executable instructions stored thereon, the generic control software being configurable for use with a plurality of different propulsion system configurations including the particular propulsion system of the particular vehicle, wherein the generic control software comprises a plurality of configuration tables that can be programmed to configure the generic control software as custom control software for the particular propulsion system configuration; and inputting, via a computer having access to the generic control software, information into the configuration tables that characterizes the particular propulsion system configuration to configure the generic control software into the custom control software that is customized for use and designed to operate with the particular propulsion system configuration of the particular vehicle.

18. A method according to claim 17, wherein the particular propulsion system configuration comprises a particular configuration of particular hardware components that are involved in propulsion of the particular vehicle.

19. A method according to claim 18, wherein the information input into the configuration tables comprises: specific values for the particular propulsion system configuration that, when programmed into the configuration tables, define characteristics of the particular hardware component configuration of the particular vehicle.

* * * * *